(12) United States Patent
Varnas

(10) Patent No.: US 8,540,365 B2
(45) Date of Patent: Sep. 24, 2013

(54) OPHTHALMIC LENS ELEMENT

(75) Inventor: Saulius Raymond Varnas, South Australia (AU)

(73) Assignee: Vision CRC Limited (AU)

( * ) Notice: Subject to any disclaimer, the term of this patent is extended or adjusted under 35 U.S.C. 154(b) by 437 days.

(21) Appl. No.: 12/739,577

(22) PCT Filed: Oct. 23, 2008

(86) PCT No.: PCT/AU2008/001568
§ 371 (c)(1),
(2), (4) Date: Nov. 2, 2010

(87) PCT Pub. No.: WO2009/052570
PCT Pub. Date: Apr. 30, 2009

(65) Prior Publication Data
US 2011/0037944 A1    Feb. 17, 2011

(30) Foreign Application Priority Data

Oct. 23, 2007   (AU) ................................ 2007905800

(51) Int. Cl.
*G02C 7/06*   (2006.01)
(52) U.S. Cl.
USPC ................................................... 351/159.42
(58) Field of Classification Search
USPC ................................................... 351/159.42
See application file for complete search history.

(56) References Cited

U.S. PATENT DOCUMENTS

| 4,912,155 A | 3/1990 | Burton |
| 4,954,591 A | 9/1990 | Belmares |
| 6,231,184 B1 * | 5/2001 | Menezes et al. ......... 351/159.42 |
| 6,343,861 B1 | 2/2002 | Kris et al. |

FOREIGN PATENT DOCUMENTS

| AU | 601779 B2 | 9/1990 |
| AU | 199350582 A1 | 5/1994 |
| AU | 665124 B2 | 12/1995 |
| CN | 200983041 Y | 11/2007 |
| EP | 1967892 A1 | 9/2008 |
| WO | WO-2006/004440 A2 | 1/2006 |
| WO | WO-2007/146673 A2 | 12/2007 |
| WO | WO-2008/045847 A2 | 4/2008 |
| WO | WO-2009/052570 A1 | 4/2009 |

OTHER PUBLICATIONS

"International Application Serial No. PCT/AU2008/001568, International Search Report mailed Dec. 5, 2008", 4 pgs.
"International Application Serial No. PCT/AU2008/001568, Written Opinion mailed Dec. 5, 2008", 6 pgs.

(Continued)

*Primary Examiner* — Scott J Sugarman
(74) *Attorney, Agent, or Firm* — Schwegman Lundberg & Woessner, P.A.

(57) ABSTRACT

An ophthalmic lens element is disclosed. The lens element includes a front surface and a rear surface, at least one which includes a horizontal meridian and a vertical meridian. A central region of the lens element includes a foveal vision zone providing a first power for providing clear foveal vision for a wearer. A peripheral region of positive power relative to the first power is also included. The peripheral region includes dual progressive zones located bilaterally of the vertical meridian and extending radially outwardly from the central region. The lens element provides a distribution of surface astigmatism which provides, on the horizontal meridian, a relatively low surface astigmatism in the central region and the progressive zones.

36 Claims, 19 Drawing Sheets

(56) References Cited

OTHER PUBLICATIONS

Gwiazda, J., et al., "A Randomized Clinical Trial of Progressive Addition Lenses versus Single Vision Lenses on the Progression of Myopia in Children", *Investigative Ophthalmology and Visual Science*, 44(4), (2003), 1492-1500.

Mutti, D. O., et al., "Peripheral Refraction and Ocular Shape in Children", *Investigative Ophthalmology and Visual Science*, 41, (2000), 1022-1030.

Stone, R. A., et al., "Ocular shape and myopia", *Annals Academy of Medicine Singapore*, 33(1), (2004), 7-15.

Toh, H. K., "Casting Composition", U.S. Appl. No. 07/781,392, filed Oct. 23, 1991.

\* cited by examiner

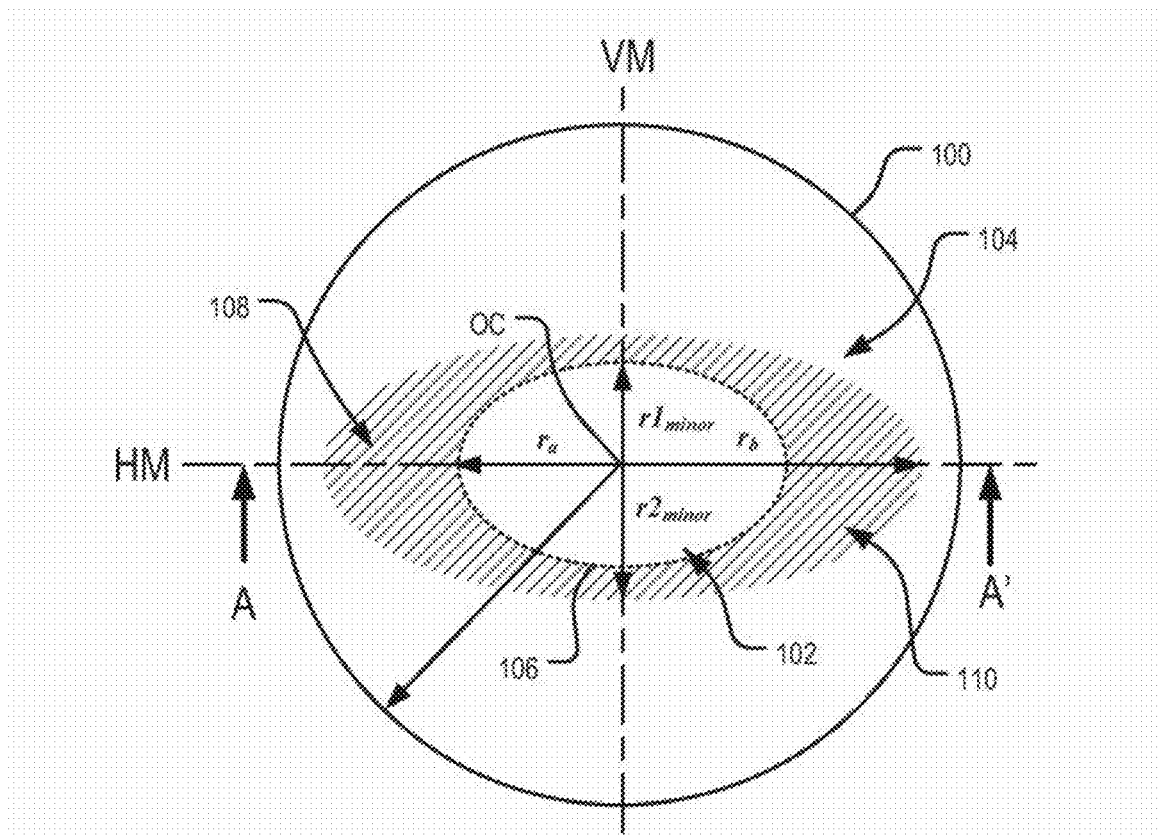
FIG. 1-A
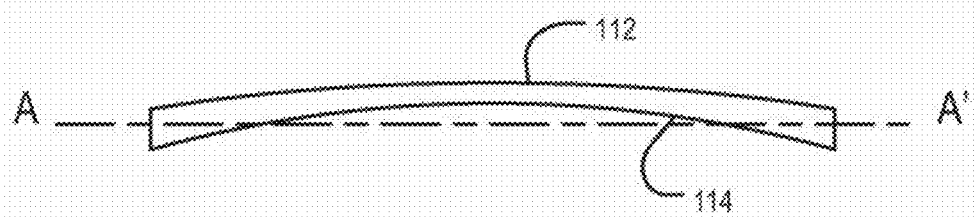
SECTION A-A'
FIG. 1-B

OPHTHALMIC LENS ELEMENT

This application is a U.S. National Stage Filing under 35 U.S.C. 371 from International Application Number PCT/AU2008/001568, filed Oct. 23, 2008 and published in English as WO 2009/052570 A1 on Apr. 30, 2009, which claims the benefit of Australian Provisional Patent Application Serial No. 2007905800, filed Oct. 23, 2007; which applications and publication are incorporated herein by reference in their entirety.

FIELD OF INVENTION

The present invention relates to ophthalmic lens elements for retarding or arresting myopia, and methods of designing such lens elements.

BACKGROUND OF THE INVENTION

To provide focussed vision, an eye must be capable of focusing light on the retina. An eye's ability to focus light on the retina depends, to a large extent, on the shape of the eyeball. If an eyeball is "too long" relative to its "on-axis" focal length (meaning, the focal length along the optical axis of the eye), or if the outside surface (that is, the cornea) of the eye is too curved, the eye will be unable to properly focus distant objects on the retina. Similarly, an eyeball that is "too short" relative to its on-axis focal length, or that has an outside surface which is too flat, will be unable to properly focus near objects on the retina.

An eye that focuses distant objects in front of the retina is referred to as a myopic eye. The resultant condition is referred to as myopia, and is usually correctable with appropriate single-vision lenses. When fitted to a wearer, conventional single-vision lenses correct myopia associated with central vision. Meaning that, conventional single-vision lenses correct myopia associated with vision that uses the fovea and parafovea. Central vision is often referred to as foveal vision.

Although conventional single-vision lenses can correct myopia associated with central vision, recent research has shown (reviewed in R. A. Stone & D. L. Flitcroft (2004) Ocular Shape and Myopia, published in Annals Academy of Medicine, Vol. 33, No. 1, pp. 7-15) that off-axis focal length properties of the eye often differ from the axial and paraxial focal lengths. In particular, myopic eyes tend to display less myopia in the retina's peripheral region as compared with its foveal region. This difference may be due to a myopic eye having a prolate vitreous chamber shape.

Indeed, a recent United States study (Mufti, D. O., Sholtz, R. I., Friedman, N. E., Zadnik, K. Peripheral refraction and ocular shape in children, Invest. Ophthalmol. Vis. Sci. 2000; Vol. 41, pp. 1022-1030) observed that the mean (±standard deviation) relative peripheral refractions in myopic eyes of children produced +0.80±1.29 D of spherical equivalent.

Interestingly, studies with chicks and monkeys have indicated that a defocus in peripheral retina alone, with the fovea staying clear, can cause an elongation of the foveal region (Josh Wallman and Earl Smith independent reports to 10th International Myopia Conference, Cambridge, UK, 2004) and the consequent myopia.

On the other hand, epidemiological studies have shown the presence of correlation between myopia and near work. It is well known that the prevalence of myopia in the well educated population is considerably higher than that for unskilled labourers. Prolonged reading has been suspected of causing a hyperopic foveal blur due to insufficient accommodation. This has led many eye care professionals to prescribing progressive addition or bi-focal lenses for juveniles manifesting progression of myopia. Special progressive lenses have been designed for use by children (U.S. Pat. No. 6,343,861). The therapeutic benefit of these lenses in clinical trials has been shown to be statistically significant in retarding progression of myopia but clinical significance appears to be limited (e.g., Gwiazda et al., 2003, Invest. Ophthalmol. Vis. Sci., Vol. 44, pp. 1492-1500).

Unfortunately, conventional myopia correcting lenses haphazardly produce clear or defocused images in the retina's peripheral region. Thus, existing ophthalmic lenses for correcting myopia may fail to remove stimuli for Myopia progression.

The discussion of the background to the invention herein is included to explain the context of the invention. This is not to be taken as an admission that any of the material referred to was published, known or part of the common general knowledge as at the priority date of any of the claims.

SUMMARY OF THE INVENTION

The present invention provides an ophthalmic lens element that provides a distribution of power and surface astigmatism which provides clear foveal vision in a central region and a peripheral region of positive (or "plus") power relative to the central region. The peripheral region includes dual progressive zones which are located bilaterally of a vertical meridian of the lens element and extend radially outwardly from the central region. The lens element provides a distribution of surface astigmatism which provides a relatively low surface astigmatism on the horizontal meridian of the lens element in both the central region and the progressive zones.

The distribution of relative plus power throughout the peripheral region provides an optical correction for retarding or arresting myopia for a wearer. Preferably, the lens element provides a distribution of relative plus power that provides a peripheral correction, or "stop signal", for a region of the periphery of the wearer's retina that lies along a horizontal meridian of the eye. Such a lens element is likely to be effective in correcting hyperopic shifts that occur in the vicinity of the horizontal meridian of the wearer's eye, and thus in retarding or arresting myopia that may result from such a shift.

The relatively low surface astigmatism on the horizontal meridian of the lens element preferably reduces the magnification of peripheral astigmatism occurring in the wearer's eye along the horizontal meridian of the eye.

The progressive zones are typically rotationally-asymmetric zones which provide, along a respective horizontal semi-meridian of the lens element, a positive gradient in power over a range defined by $r_a \leq r_x \leq r_b$ in which $r_a$ and $r_b$ are radial distances from the optical centre (OC) of the lens. Thus, the radial extent of each progressive zone, along a respective horizontal semi-meridian of the lens element, may be defined as the difference between $r_a$ and $r_b$. Typically $r_a$ will define the start of a progressive zone along the horizontal semi-meridian and $r_b$ will define the terminus of the progressive zone along the horizontal semi-meridian of the lens element. It is to be understood that although $r_a$ and $r_b$ denote radial distances of each progressive zone relative to the optical centre of the lens element, each progressive zone may have different respective values for $r_a$ and $r_b$. Hence, it is not essential that the progressive zones be arranged symmetrically about the vertical meridian, relative to each other.

Thus, the present invention provides an ophthalmic lens element, including a front surface and a rear surface, at least one of the surfaces including a horizontal meridian and a vertical meridian, the lens element including:

a central region including a foveal vision zone providing a first power for providing clear foveal vision for a wearer; and a peripheral region of positive power relative to the first power, the peripheral region including dual progressive zones located bilaterally of the vertical meridian and extending radially outwardly from the central region;

wherein the lens element provides a distribution of surface astigmatism which provides, on the horizontal meridian, a relatively low surface astigmatism in the central region and the progressive zones.

Preferably, and as described earlier, each progressive zone provides a mean power profile along a respective horizontal semi-meridian of the lens element that provides a positive power gradient over a range defined by $r_a \leq r_x \leq r_b$ in which $r_a$ and $r_b$ are radial distances along each horizontal semi-meridian from the optical centre of the lens element. In other words, $r_a$ is associated with inner (or minimum) radial extent of a respective peripheral zone, and $r_b$ is associated with an outer (or maximum) radial extent of a respective peripheral zone.

The foveal vision zone of the central region will typically be a zone that is suitable for a wearer's on-axis vision tasks and thus will typically be an optical zone that is suitable for "straight ahead" viewing, or substantially "straight ahead" viewing. The foveal vision zone will thus typically be positioned in a part of the lens element likely to be used for on-axis vision.

The first power may be a prescribed power that corresponds with an optical correction required to provide the wearer with clear foveal vision for a particular viewing task or activity, which may include, for example, a normal viewing activity, such as a distance viewing activity or reading.

The value of the power in the foveal vision region will typically be selected to provide an optical correction which is based on the wearer's vision requirements. For example, for a wearer with foveal myopia, the foveal vision zone may provide a prescribed power that provides a negative (or "minus") power correction. Alternatively, for a wearer with unaided clear foveal vision (that is, an emmetrope), but who may have a predisposition (such as a genetic or ethnic predisposition) to myopia, an optical correction in the foveal vision zone may not be required in which case the front and rear surfaces of the foveal vision zone may form a plano lens. Alternatively, for a wearer with foveal hyperopia, the foveal vision zone may provide a prescribed power that provides a positive (or "plus") power correction. Finally, for a wearer with presbyopia, the first power may be a prescribed power that corresponds with an optical correction required to provide the wearer with either clear distance vision or clear near vision.

The lens surface including the foveal vision zone of the ophthalmic lens element may be designed to be used at relatively low plus and minus prescribed powers. For example, a base curve in the range of 0.50 D to 5.00 D may be used. However, in some embodiments, a base curve of more than about 8.00 D may be suitable. For example, a higher base curve (that is a base curve of more than about 8.00 D) may provide a power profile of peripheral mean power which provides, for a static eye (that is, an eye looking "straight ahead") a reduced hyperopic shift in the peripheral region of the wearer's retina for peripheral rays entering the wearer's eye at oblique angles as compared to the previously described examples. Furthermore, a lens element with a relatively high base curve may be also suitable for use with highly curved frames (for example, "wrapped" frames) and thus enhance the area of peripheral retina exposed to images formed by the lens element. Suitable relatively higher base curve for a wearer may be determined using static eye ray tracing techniques which would be well known a skilled addressee.

As previously explained, the first power (or the refracting power) of the foveal vision zone of the lens element may vary according to a wearer's requirements, and may be in the range of, for example, plano to −4.00 D.

In an embodiment of the present invention, the central region is shaped to extend downwardly so that the foveal vision zone provides a zone of clear foveal vision, at least for an extent of eye declination, that is aligned with a wearer's eyepath over that extent of declination. An embodiment that includes a central region having a foveal viewing zone that extends downwardly may reduce the need for the wearer to tilt their head during near vision tasks, such as reading, and thus may make the lens more comfortable to wear.

In an embodiment, the power distribution of the dual progressive zones contributes to an optical correction for correcting peripheral vision substantially along the horizontal meridian of the eye, when the wearer is viewing objects through the foveal vision zone of the central region. In such an embodiment, and when in use, the power distribution of the dual progressive zones may provide a stimulus for retarding or arresting myopia in the form of a "stop signal" to the undesirable growth of the eye that retards or arrests myopia progression.

Thus, one embodiment of the present invention provides an ophthalmic lens element that provides suitable optical corrections for a wearer's on-axis vision requirements, whilst simultaneously providing a stop signal for retarding or arresting myopia that may otherwise have resulted from an eye's constant exposure to hyperopic blur in the peripheral retina along the horizontal meridian of the eye.

In an embodiment, the "stop signal" may compensate for a varying focal plane of the wearer's eye to remove most of the hyperopic blur from the peripheral region of the retina located substantially along the horizontal meridian of the eye, for a primary foveal vision eye position. It is expected that the distribution of the positive power throughout the peripheral region of an ophthalmic lens element in accordance with an embodiment of the present invention will provide an optical correction that provides the stop signal for undesirable ocular growth, thus leading to retardation or arresting of myopia.

The front and back surfaces of the lens element may be shaped to provide suitable contours of refracting power for the central region and the peripheral region.

The front surface and the back surface of the lens element may have any suitable shape. In an embodiment, the front surface is an aspherical surface and the rear surface is spherical or toric.

In another embodiment, the front surface is a spherical surface and the rear surface is aspherical.

In yet another embodiment, both the front and rear surfaces are aspherical. It will be appreciated that an aspherical surface may include, for example, an atoric surface.

As already explained, the first power and the peripheral power (that is, the positive mean power of the progressive zones in the peripheral region) will typically correspond with different optical correction requirements of the wearer. In particular, the first power will correspond with an on-axial, or paraxial, optical correction required to provide clear vision (that is, foveal vision) for a wearer's distance vision tasks, whereas the peripheral power will provide an off-axis optical correction when viewing distant objects through the foveal vision zone.

The maximum positive (or "plus") power of the progressive zones along a respective horizontal semi-meridian of the lens element will typically be specified as a single value of surface power, and usually in terms of a positive mean power at a particular radial extent along a respective horizontal semi-meridian from the optical centre (OC) of the lens element. In this respect, the maximum plus power will typically occur at the outer radial extent of the progressive zone, $r_b$.

The maximum plus power, and indeed the distribution of the plus power, in the progressive zones along a respective horizontal semi-meridian (for example, the gradient of plus power in the progressive zones, or the radial extent of the progressive zones, along a respective horizontal semi-meridian) may be selected based on optical correction requirements expressed in terms of clinical measurements that characterise the wearer's peripheral correction requirements along the horizontal meridian of the wearer's eye, that is, the optical correction required to correct a wearer's peripheral vision along the horizontal meridian. Any suitable technique may be used to obtain those requirements including, but not limited to, peripheral Rx data or ultrasound A-Scan data. Such data may be obtained through the use of devices that are known in the art, such as an open field auto-refractor (for example, a Shin-Nippon open field auto-refractor).

As explained above, the peripheral region is a region of positive (or "plus") power relative to the first power and so provides "a plus power correction". The plus power may be in the range of about 0.50 D to 3.00 D relative to the first power at the optical centre of the lens element. However, a plus power in range of about 1.00 D to 2.00 D may also be suitable. Thus, and as will be appreciated by a skilled reader, the plus power may not be confined to the dual progressive zones and, in some embodiments, the peripheral region provides a region of plus power, relative to the power of the central region, that entirely surrounds the central region. However, it is preferred that only the value and distribution of plus power in the progressive zones is selected so as to provide a desired peripheral correction for a wearer. In addition, it is also preferred that the progressive zones provide a distribution of relatively low astigmatism which extends on and along the horizontal meridian of the lens element. Hence, not only will each progressive zone provide a desired peripheral correction but it will also provide a region of relatively low surface astigmatism located on and along the respective horizontal semi-meridian.

In terms of the radial extents $r_a$ and $r_b$, in an embodiment, and for each progressive zone, $r_a$ may correspond with the intersection of the boundary of the central region with the respective horizontal semi-meridian. The boundary will typically be defined in terms of a power increase, such as a contour representing a 0.25 D increase in mean surface power relative to the mean surface power at the optical centre (OC) of the lens element.

In other words, the radial $r_a$ may have an extent which corresponds to the distance, from the optical centre (OC), at which the foveal vision zone boundary, as defined by a 0.25 increase in mean power, and a respective horizontal semi-meridian of the lens element intersect. Thus, for each progressive zone, $r_a$ may have an extent that corresponds with the start of the progressive zone along the respective horizontal semi-meridian. On the other hand, for each progressive zone, the radial extent $r_b$ may correspond to the distance from the optical centre (OC) at which a contour of a predefined mean power increase intersects with a respective horizontal semi-meridian of the lens element.

In an embodiment, the difference between $r_a$ and $r_b$ may not be less than substantially 12 mm. For example, in one embodiment, the range defined by $r_a \leq r_x \leq r_b$ is substantially 8 mm $\leq r_x \leq$ 22 mm. As will be appreciated, a range defined by $r_a \leq r_x \leq r_b$ will provide, when a lens manufactured from the lens element is fitted to a lens wearer, an associated field angle representing a field of vision through which the wearer can fixate on objects whilst viewing through the central region of the lens element. For example, the range defined by 8 mm $\leq r_x \leq$ 20 mm may correspond with a field angle of substantially between 25° and 50° at a vertex distance of substantially 12 mm. As will be appreciated, the actual field angle will vary somewhat according to the position of wear of a lens.

In an embodiment, the positive gradient in plus power over the range $r_a \leq r_x \leq r_b$ provides a positive mean power increase of at least 1.00 D at the radial distance ($r_b$) of substantially 22 mm from the optical centre relative to the refracting power at the optical centre.

In another embodiment, the positive gradient in plus power over the range $r_a \leq r_x \leq r_b$ provides a positive mean power increase of at least 1.50 D at the radial distance ($r_b$) of substantially 22 mm from the OC relative to the refracting power at the optical centre.

In yet another embodiment, the positive gradient in plus power over the range $r_a \leq r_x \leq r_b$ provides a positive mean power increase of at least 2.00 D at the radial distance ($r_b$) of substantially 22 mm from the OC relative to the refracting power at the optical centre.

In yet another embodiment, the positive gradient in plus power over the range $r_a \leq r_x \leq r_b$ provides a positive mean power increase of at least 2.50 D at the radial distance ($r_b$) of substantially 22 mm from the OC relative to the refracting power at the optical centre.

In yet another embodiment, the positive gradient in plus power over the range $r_a \leq r_x \leq r_b$ provides a positive mean power increase of at least 3.00 D at the radial distance ($r_b$) of substantially 22 mm from the OC relative to the refracting power at the optical centre.

In an embodiment, the foveal vision zone may be shaped and/or sized to provide a required optical correction over a range of eye-rotations for distance vision tasks. In other words, the foveal vision zone may have a shape and/or size to support a wearer's vision requirements throughout an angular range of eye rotations. For example, in one embodiment the central region extends downwardly to provide a shape and/or size providing a region of low surface astigmatism over a range of eye-rotations for a wearer's near vision tasks. In other words, central region may be shaped and/or sized to support, for example, a wearer's near vision requirements throughout an angular range of eye rotations.

An ophthalmic lens element according to an embodiment of the present invention may be formulated from any suitable material. In one embodiment a polymeric material may be used. The polymeric material may be of any suitable type, for example, it may include a thermoplastic or thermoset material. A material of the diallyl glycol carbonate type, for example CR-39 (PPG Industries) may be used.

The polymeric article may be formed from cross-linkable polymeric casting compositions, for example as described in U.S. Pat. No. 4,912,155, U.S. patent application Ser. No. 07/781,392, Australian Patent Applications 50581/93, 50582/93, 81216/87, 74160/91 and European Patent Specification 453159A2, the entire disclosures of which are incorporated herein by reference.

The polymeric material may include a dye, preferably a photochromic dye, which may, for example, be added to the monomer formulation used to produce the polymeric material.

An ophthalmic lens element according to an embodiment of the present invention may further include standard additional coatings to the front or back surface, including electrochromic coatings.

The front lens surface may include an anti-reflective (AR) coating, for example of the type described in U.S. Pat. No. 5,704,692, the entire disclosure of which is incorporated herein by reference.

The front lens surface may include an abrasion resistant coating, for example, of the type described in U.S. Pat. No. 4,954,591, the entire disclosure of which is incorporated herein by reference.

The front and back surfaces may further include one or more additions conventionally used in casting compositions such as inhibitors, dyes including thermochromic and photochromic dyes, for example, as described above, polarising agents, UV stabilisers and materials capable of modifying refractive index.

The present invention also provides An ophthalmic lens element including a lens surface having:
  a horizontal meridian and a vertical meridian;
  a central region including a foveal vision zone providing a surface power to achieve a refracting power for providing clear foveal vision for a wearer; and
  a peripheral region of positive surface mean power relative to the surface power of the central region, the peripheral region including dual progressive zones located bilaterally of the vertical meridian and extending radially outwardly along the horizontal meridian from the central region, each progressive zone providing a gradual increase in surface mean power from the surface power of the central region;
  wherein the lens surface provides a distribution of surface astigmatism which provides, along the horizontal meridian, a relatively low surface astigmatism in the central region and the progressive zones.

The present invention also provides a method of dispensing or designing an ophthalmic lens element for retarding or arresting myopia, the method including:
  obtaining, for the wearer:
    a first required value of optical correction for a foveal vision zone to provide foveal vision for on-axis viewing tasks; and
    a second required value of optical correction for providing a stimulus for retarding or arresting myopia in a peripheral region of a wearer's eye located on a horizontal meridian of the eye;
  selecting or designing an ophthalmic lens element according to the values of optical correction, the ophthalmic lens element having a front surface and a rear surface, at least one of the surfaces including a horizontal meridian and a vertical meridian, the lens element including:
    a central region including a foveal vision zone providing a first power corresponding to the first required value; and
    a peripheral region of positive power relative to the first power, the peripheral region including dual progressive zones located bilaterally of the vertical meridian and extending radially outwardly from the central region, the progressive zone providing a value or distribution of plus power according to the second required value;
    wherein the lens element provides a distribution of surface astigmatism which provides, on the horizontal meridian, a relatively low surface astigmatism in the central region and the progressive zones In one embodiment, a method according to the present invention may further include:
  determining the head movement and/or eye movement characteristics of the wearer; and
  sizing the foveal vision zone according to the head movement and eye movement characteristics of the wearer.

Ideally, the central region will be sized to support clear foveal vision throughout an angular range of eye rotations encompassing a wearer's distance vision and near vision requirements.

A method according to an embodiment of the present invention may be performed by a processing system including suitable computer hardware and software. Thus, the present invention also provides a processing system for dispensing or designing an ophthalmic lens element for retarding or arresting myopia in a wearer's eye, the system including:
  an input means for obtaining, for the wearer:
    a first required value of optical correction for foveal vision for on-axis viewing tasks; and
    a second required value of optical correction for providing a stimulus for retarding or arresting myopia in a peripheral region of a wearer's eye located along the horizontal meridian of the wearer's eye;
  a processing means for processing the values of optical correction to select or design an ophthalmic lens element according to the values of optical correction, the ophthalmic lens element having a front surface and a rear surface, at least one of the surfaces including a horizontal meridian and a vertical meridian, the lens element including:
    a central region including a foveal vision zone providing a first power corresponding to the first required value; and
    a peripheral region of positive power relative to the first power, the peripheral region including dual progressive zones located bilaterally of the vertical meridian and extending radially outwardly from the central region, the progressive zone providing a value or distribution of plus power according to the second required value;
    wherein the lens element provides a distribution of surface astigmatism which provides, on the horizontal meridian, a relatively low surface astigmatism in the central region and the progressive zones.

In an embodiment, a system according to the present invention further includes:
  input means for accepting or obtaining head movement and eye movement characteristics for the wearer; and
  processing means for modifying the size and/or shape of the foveal vision zone according to the head movement and eye movement characteristics of the wearer.

The present invention also provides a method of retarding or arresting myopia, the method including providing, to a wearer, spectacles bearing a pair of ophthalmic lens elements, each ophthalmic lens being for a respective eye of the wearer and having a front surface and a rear surface, at least one of the surfaces including a horizontal meridian and a vertical meridian, the lens element including:
  a central region including a foveal vision zone providing a first power for providing clear foveal vision for a wearer; and
  a peripheral region of positive power relative to the first power, the peripheral region including dual progressive zones located bilaterally of the vertical meridian and extending radially outwardly from the central region;
  wherein the lens element provides a distribution of surface astigmatism which provides on the horizontal meridian a relatively low surface astigmatism in the central region and the progressive zones.

A preferred embodiment of a lens element according to the invention provides an ophthalmic lens element having a peripheral region that provides, in bilaterally located progressive zones, a positive mean power (that is, "a plus power correction") relative to the foveal vision zone of the central region. However, since positive refracting power is not accommodatable, it will induce blur on the fovea of the retina when the eye rotates to view objects in the periphery of the original field of view. To remedy this, an embodiment of the ophthalmic lens element provides a central region that includes a foveal vision zone that is sized to provide a prescribed power over an area that corresponds with a wearer's typical eye rotations for vision tasks, whilst also providing a suitably sized region for providing a suitable peripheral correction.

Thus, an embodiment may provide a correct foveal correction, not just for on-axis vision requirements, but also in an area representing the extent of typical eye rotations before the head rotation gets engaged.

The level of the plus power correction required by wearer will vary, given the large scatter in the myopic peripheral refractions found by Mutti et al. (2000). Thus, in a series embodiment of the present invention, a number of peripheral aspherisations may be provided with the range of plus power corrections.

Before turning to a description of an embodiment of the present invention, there should be some explanation of some of the language used above and throughout the specification.

For example, the reference in this specification to the term "lens element" is a reference to all forms of individual refractive optical bodies employed in the ophthalmic arts, including, but not limited to lenses (including contact and spectacle lenses), lens wafers and semi-finished lens blanks requiring further finishing to a particular patient's prescription. Thus, the present invention also provides a semi-finished ophthalmic lens blank including a first surface having:

a horizontal meridian and a vertical meridian;

a central region including a foveal vision zone providing a surface power to achieve a refracting power for providing clear foveal vision for a wearer; and a first progressive zone located nasally of the central region and a second progressive zone located temporally of the central region, each progressive zone extending radially outwardly from the central region to provide a gradual increase in surface mean power along the horizontal meridian;

wherein the surface provides a distribution of surface astigmatism which provides, along the horizontal meridian, a relatively low surface astigmatism in the central region and the progressive zones.

In an embodiment, a finished lens element may be formed for a wearer, from the semi-finished lens blank, the finished lens providing a second surface which optically combines with the first surface so that when worn by the wearer the finished lens element positions the tangential focal plane and the sagittal focal plane on or in front of the wearer's retina along the horizontal meridian of the eye.

With respect to the references "horizontal meridian", such references denote an imaginary line horizontally extending from the left hand side of the lens element to the right hand side of the lens element, through the optical centre of the lens. References to the term "horizontal semi-meridian" denote an imaginary line extending outwardly from the geometric centre of the lens, along the horizontal meridian and terminating at an outer perimeter of the lens element.

Further, with respect to references to the term "surface astigmatism", such references are to be understood as a reference to a measure of the degree to which the curvature of the lens varies among intersecting planes which are normal to the surface of the lens at a point on the surface.

Further, with respect to references to the term "relatively low surface astigmatism", such references are to be understood as a reference to an astigmatism of less than about 0.5 D.

Throughout this specification, references to the term "foveal region" are to be understood as a reference to a region of the retina that includes the fovea and that is bounded by the parafovea.

An ophthalmic lens element according of the present invention may simultaneously and substantially corrects both central and peripheral vision during distance vision tasks. Correction of this type is expected to remove, or at least delay, a presumed trigger of myopia progression in myopes, particularly in myopic juveniles.

BRIEF DESCRIPTION OF THE DRAWINGS

The present invention will now be described in relation to various examples illustrated in the accompanying drawings. However, it must be appreciated that the following description is not to limit the generality of the above description.

In the drawings:

FIG. 1-A is a front view of an ophthalmic lens element according to a first embodiment of the present invention;

FIG. 1-B is a sectional view of the ophthalmic lens element illustrated in FIG. 1-A;

DETAILED DESCRIPTION OF THE DRAWINGS

Figure 2:
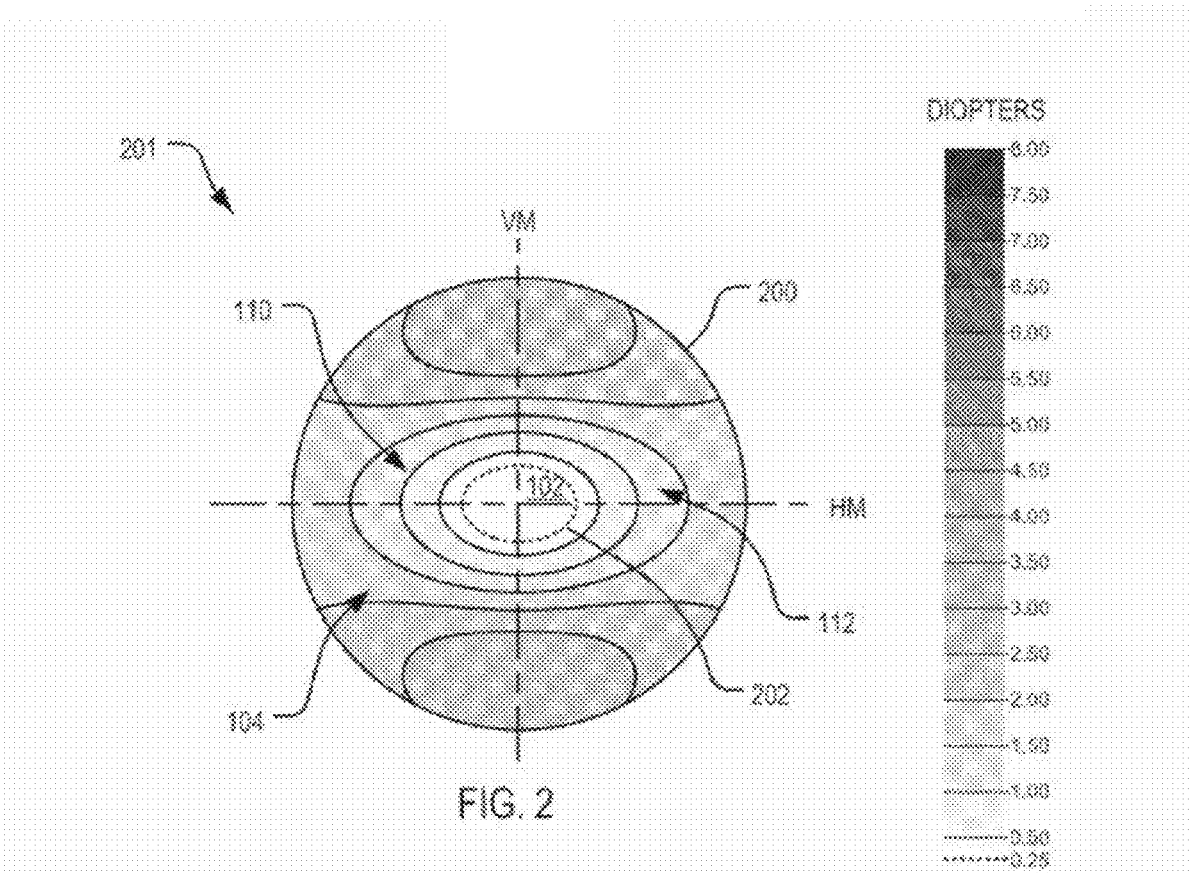
FIG. 2 is a contour diagram of surface mean addition power for a lens element in accordance with a first embodiment having a diameter of 80 mm.

FIG. 1-A illustrates a front view of an ophthalmic lens element 100 in accordance with an embodiment of the present invention. The ophthalmic lens element 100 includes a central region 102 (shown bounded by a dashed line) and a peripheral region 104 (shown as the region located outside the dashed line and including the shaded region).

In the illustrated example, the central region 102 is depicted as an asymmetric region in the form of an ellipse bounded by a +0.25 D contour 106 of mean surface power. In the present example, the +0.25 D contour forms an ellipse which is substantially centred at the intersection of a horizontal meridian (HM) and a vertical meridian (VM) of the front surface of the lens element 100 at the optical centre (OC) of the lens element 100.

In the embodiment illustrated in FIG. 1A, the +0.25 D contour has a major radial $r_a$ which extends from the optical centre (OC) of the lens 100 along the horizontal meridian (HM), and a minor radial $r1_{minor}$ which extends from the optical centre (OC) along the vertical meridian (VM), such that $r_a > r1_{minor}$.

In the illustrated embodiment the central region 102 is elongated along the horizontal meridian (HM) and extends to an outer boundary located at a radius $r_a$ which, at each side of the lens element 100, corresponds with the beginning of progressive zones 108, 110 of the peripheral region 104. As shown, the progressive zones 108, 110 are located bilaterally of the vertical meridian (VM) and extend radially outwardly from the central region 102 and along the horizontal meridian (HM). In other words, progressive zone 108 is located on one side of the vertical meridian (VM) and progressive zone 110 is located on the other side of the vertical meridian (VM). Both progressive zones 108, 110 extend along, and thus are positioned about, a respective horizontal semi-meridian of the horizontal meridian (HM). Thus, when worn by a wearer the progressive zones 108, 110 of the lens element are positioned nasally and temporally.

Each progressive zone 108, 110 (again, shown as a shaded region) of the peripheral region 104 provides a gradual transition in mean power from the refracting power at the boundary 106 of the central region 102 to an outer boundary in the peripheral region 104. In the present case the outer boundary is an ellipse having a major radial $r_b$ and a minor radial $r2_{minor}$ such that $r_b > r2_{minor}$.

In the present case, the progressive zones 108, 110 are shaped so as to have outer boundary that is located along a respective horizontal semi-meridian of the horizontal meridian (HM) at a radial extent $r_b$. Thus, in the illustrated example each progressive zone 108, 110 has a radial extent along the respective horizontal semi-meridians, of $r_b - r_a$.

FIG. 1-B shows a cross-sectional view of the lens element 100 depicted in FIG. 1-A along the line A-A'. As shown, the lens element 100 includes a front surface 112 and a back, or rear, surface 114. In the present example, the central region 102 of the front surface 112 provides a central crown curvature that extends out to a radius of $r_a$. The front surface 112 also provides, in the peripheral region 104, a marginal mean curvature. In this respect, where used throughout this specification, references to the term "marginal mean curvature" are to be understood as a reference to a constant mean curvature which lies outside the progressive zones 108, 110 and which is typically located at the circumference of the lens element 100.

The front surface 112 and the rear surface 114 of the lens element 100 may have any suitable shape for providing the desired distribution of power and astigmatism. For example, the front surface 112 may be an aspherical surface and the rear surface may be spherical or toric. Alternatively, the front surface may be a spherical surface and the rear surface may be aspherical. Alternatively, both the front 112 and rear surfaces 114 may be aspherical. It will be appreciated that an aspherical surface may include, for example, an atoric surface.

In one embodiment, the front surface 112, or the rear surface 114 of the ophthalmic lens element 100 may have a shape that has been constructed by blending two surfaces of different curvature, such as a sperical and a toric surface. Different methods for blending two surfaces of different curvature, would be known to a skilled reader. One suitable method includes, for example, a numerical method starting with a spherical central surface and extending that surface, using a quadratic function of the distance from the central region's boundary. The radial quadratic function extending from each boundary point is employed to give the resulting surface continuous first and second derivatives at the boundary. Alternatively two surfaces of different curvature may be blended using a weighting function M(r). Such a surface may be defined, for example, by the surface height function:

$$z_o(x,y) = M(r)g_o(\lambda) + (1-M(r))g_l(\lambda)$$

where $$r = \sqrt{x^2 + y^2},$$

$$\lambda = \sqrt{(ax)^2 + (by)^2},$$

and $$M(r) = \frac{e^{-mr^2}}{1 + nr^p},$$

$$g_o(\lambda) = R_o - \sqrt{R_o^2 - \lambda^2},$$

$$g_1(\lambda) = R - \sqrt{R^2 - \lambda^2},$$

$$R = R_1(1 - tr),$$

with the parameters $R_o$, $R_l > 0$, and a, b, m, n, p, t ≧ 0.

In this example, if r=0, then M(r)=1 and $z_o = g_o(\lambda)$ which is an ellipsoidal surface with centre (0, 0, $R_o$) and semi-axes $$\frac{R_o}{a}, \frac{R_o}{b}$$

and $R_o$ in the x, y and z directions respectively. A similar argument can apply for large values of r. Here M(r)≈0 and hence $z_o \approx g_l(\lambda)$ a second ellipsoidal surface. For r values in between the M(r) function blends the two ellipsoidal surfaces together. M(r) can be any suitable weighting function. In the present example, the inner ellipsoid is a sphere.

In the present example, the shape of the lens surfaces is controlled by the following parameters:

$R_o$: The radius of curvature at the optical centre (OC) of the lens (hereinafter the "crown radius").

$R_l$: The radius of curvature towards the temporal edge of the lens (in other words, the marginal radius).

a, b: scaling factors for the x and y axes in $g_o$ and $g_l$. For example, selecting a=1 and b>1 will result in a non-rotationally symmetric surface which is steeper in the y direction.

m, n, p: parameters defining the function M(r) and where and how rapidly the transition between the central region and peripheral region occurs.

t: parameter to allow a gradual increase in the curvature of the peripheral region as r increases.

Example 1

With reference now to FIG. 2 to FIG. 6, a lens element 201 according to an embodiment of the present invention was designed having a 3.0 D (in 1.53 index) base curve and a diameter of 80 mm. The illustrated lens element 201 has a mean crown curvature of 3.40 D in 1.60 index, and a mean curvature of 3.65 D at 10 mm from the optical centre (OC) along the horizontal meridian. The mean curvature of the lens element 201 at 22 mm from the optical centre, along the horizontal meridian, is 4.47 D.

Figure 3:
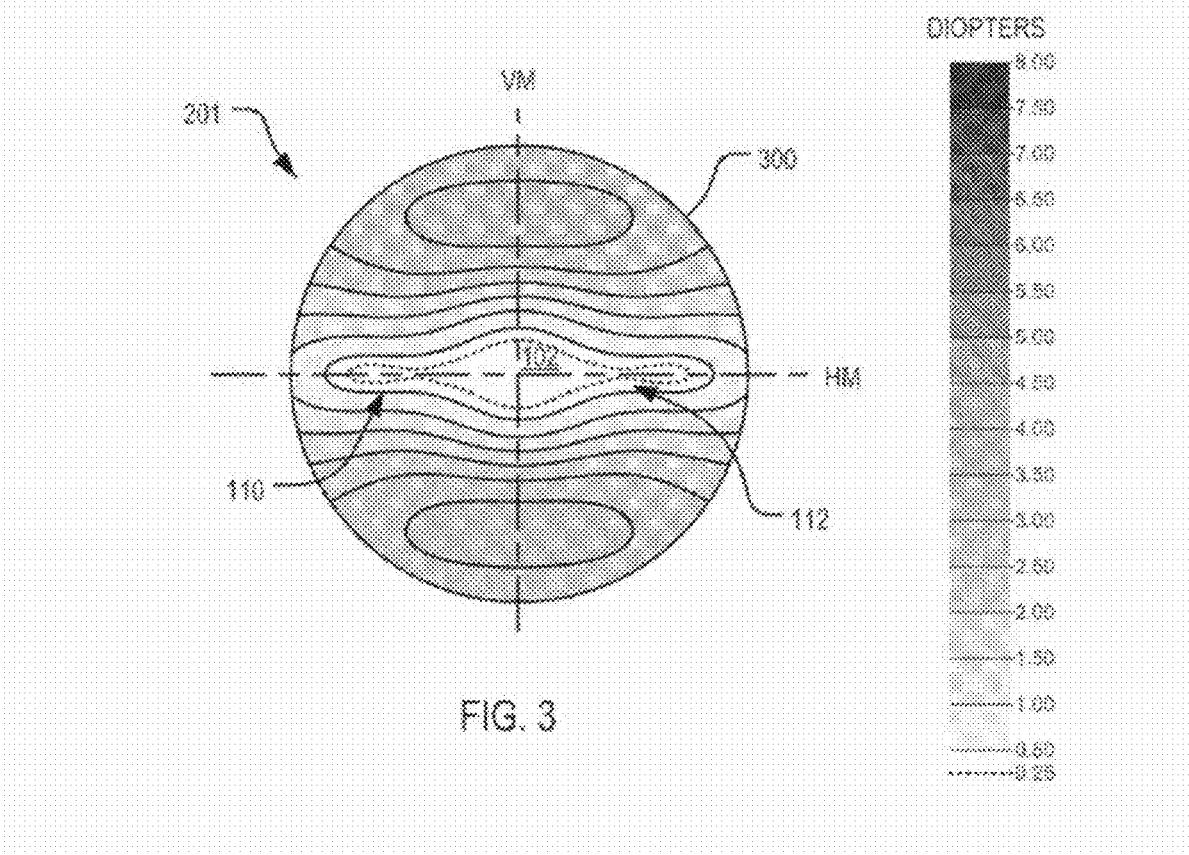
FIG. 3 is a contour diagram of surface astigmatism for the lens element of FIG. 2.

FIG. 2 shows a contour diagram 200 of surface mean addition power for the lens element 201 relative to the power at the optical centre. FIG. 3 is a contour diagram of surface astigmatism for the lens element 201.

In this example, the lens element 201 was designed by blending two surfaces of different curvature using a weighting function M(r). Table 1 lists the parameter values used for the weighting function.

TABLE 1

| Parameter | Value |
| --- | --- |
| $R_o$ | 136.5 |
| t | 0 |
| $R_l$ | 176.67 |
| m | 0 |
| n | 0.00015 |
| p | 2.45 |
| a | 1.0 |
| b | 1.25 |

As shown in FIG. 2, a 0.25 D power contour 202 (shown as a dashed line) defines a central region 102, which is a region of low surface astigmatism, and which includes a foveal vision zone. The foveal vision zone provides a first refracting power (hereinafter "the first power") for providing clear foveal vision for a wearer.

The lens element 201 also includes a peripheral region 104 of positive refracting power (hereinafter "the positive power") relative to the first power. In the present case, the peripheral region 104 is the entire region located outside of, and surrounding, the 0.25 D mean power contour 202.

The peripheral region 104 includes dual progressive zones 108, 110 which are located bilaterally of the vertical meridian (VM). As shown, the progressive zones 108, 110 extend radially outwardly from the optical centre (OC). However, the extent of the progressive zones 108, 110 along the horizontal meridian (HM) is greater than in other radial directions.

In the present case, the progressive zones 108, 110 each extend along a respective horizontal semi-meridian between a radial extent of about 10 mm from optical centre to about a radial extent of 22 mm from the optical centre (OC).

As is shown in FIG. 3, the lens element 201 provides a distribution of surface astigmatism 300 which provides a relatively low surface astigmatism on the horizontal meridian (HM) in the central region 102 and in the progressive zones 108, 110.

Figure 4:
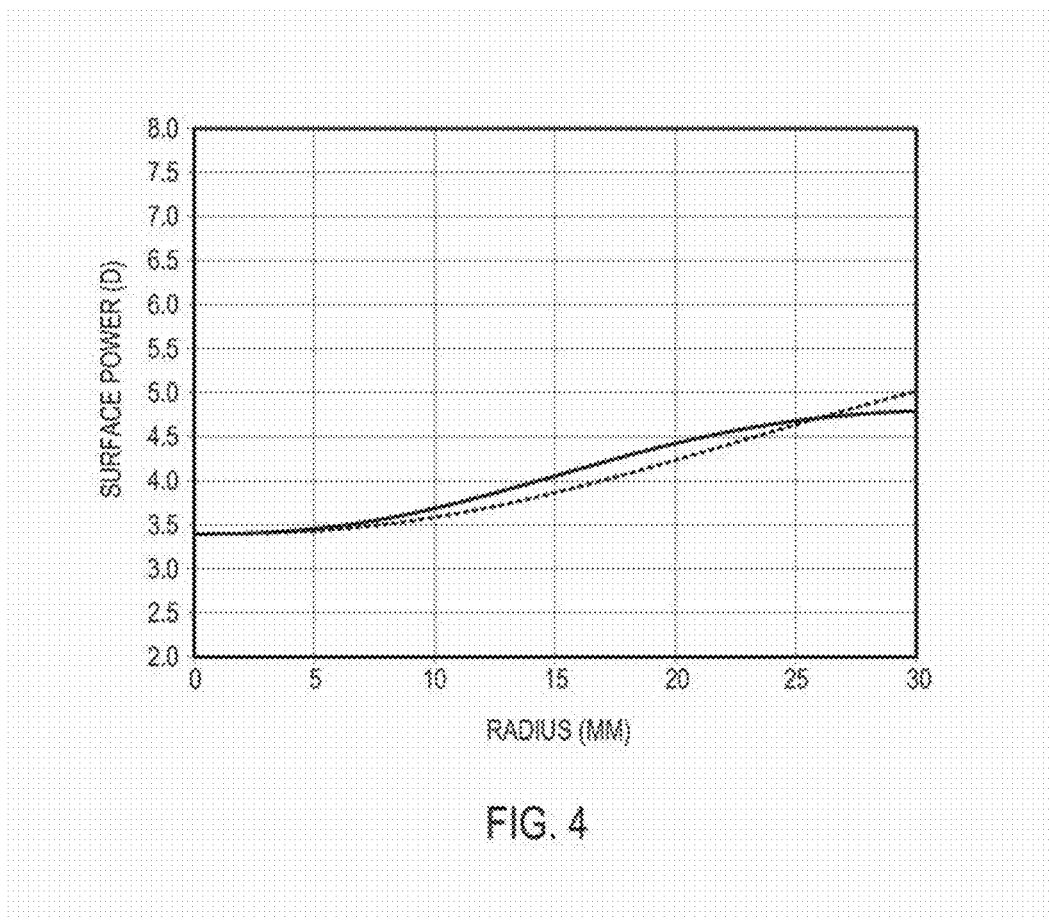
FIG. 4 is graph representing values of tangential (solid line) and sagittal (dashed line) curvature along a horizontal meridian for a lens element having the contour plot of mean surface addition power shown in FIG. 2.

Turning now to FIG. 4, there are shown two graphs representing values of tangential curvature (shown as a solid line) and sagittal curvature (shown as a dashed line) on the horizontal meridian (HM) out to a radial extent of 30 mm for a lens element 201 having the contour plot of surface mean addition power shown in FIG. 2. As shown, the difference between the tangential and sagittal curvature on the horizontal meridian (HM) is relatively small. Indeed, in the present example the error (in other words, the difference) between the tangential and sagittal curvature on the horizontal meridian (HM) is less than about 0.25 D. Advantageously, maintaining a relatively low difference between the tangential curvature and the sagittal curvature along the horizontal meridian may help maintain astigmatism within acceptable limits.

Figure 5:
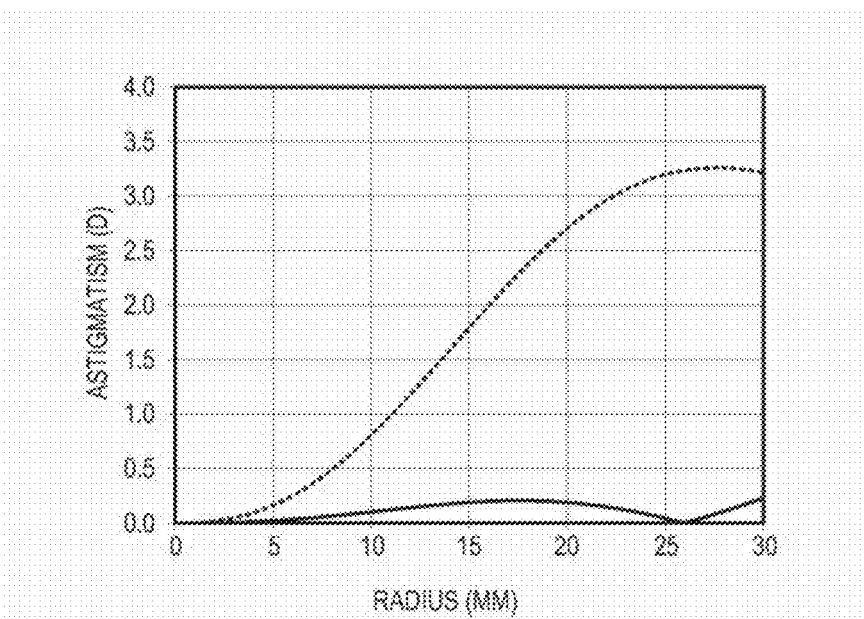
FIG. 5 is a graph representing values of front surface astigmatism along horizontal and vertical meridians for a lens element having the contour plot of surface astigmatism shown in FIG. 3.

FIG. 5 includes two graphs mapping values of front surface astigmatism on the vertical meridian (with the values of astigmatism represented as a dashed line) and the horizontal meridian (the values of astigmatism represented as a solid line). As shown, the front surface of the lens element 201 provides a distribution of surface astigmatism which provides a relatively low surface astigmatism along the horizontal meridian (HM) of the lens element in the central 102 and progressive zones 108, 100. Indeed, in this example the maximum surface astigmatism at any point on the horizontal meridian (HM) out to a radial extent of 30 mm is less than about 0.25 D.

Figure 6:
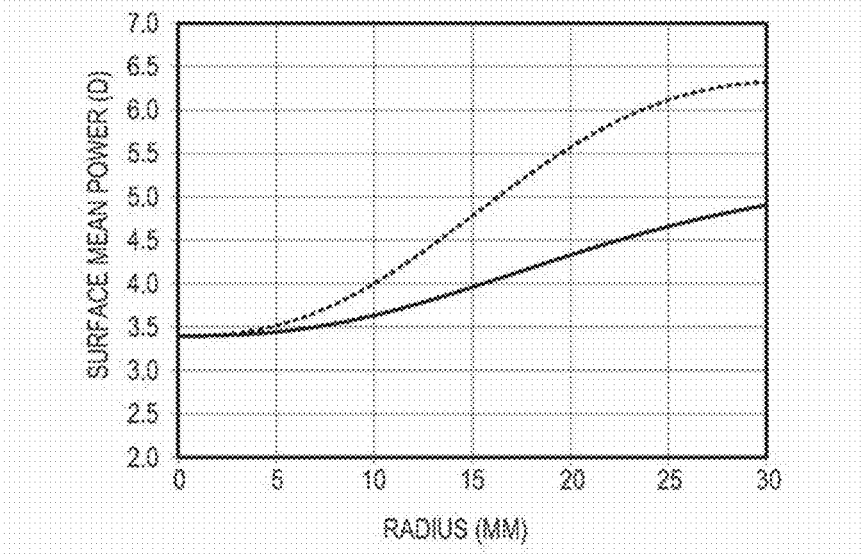
FIG. 6 is a graph representing values of front surface mean power along horizontal and vertical meridians for a lens element having the contour plot of mean surface addition power shown in FIG. 2.

FIG. 6 includes two graphs mapping values of front surface mean power on the vertical meridian (with the values of surface mean power represented as a dashed line) and on the horizontal meridian (the values of surface mean power represented as a solid line). As shown, the front surface of the lens element 201 provides a gradual increase in surface mean power along both the vertical meridian (VM) and the horizontal meridian (HM). However, the increase in surface mean power along the horizontal meridian distribution is not as pronounced as that which occurs along the vertical meridian.

Example 2

Figure 7:
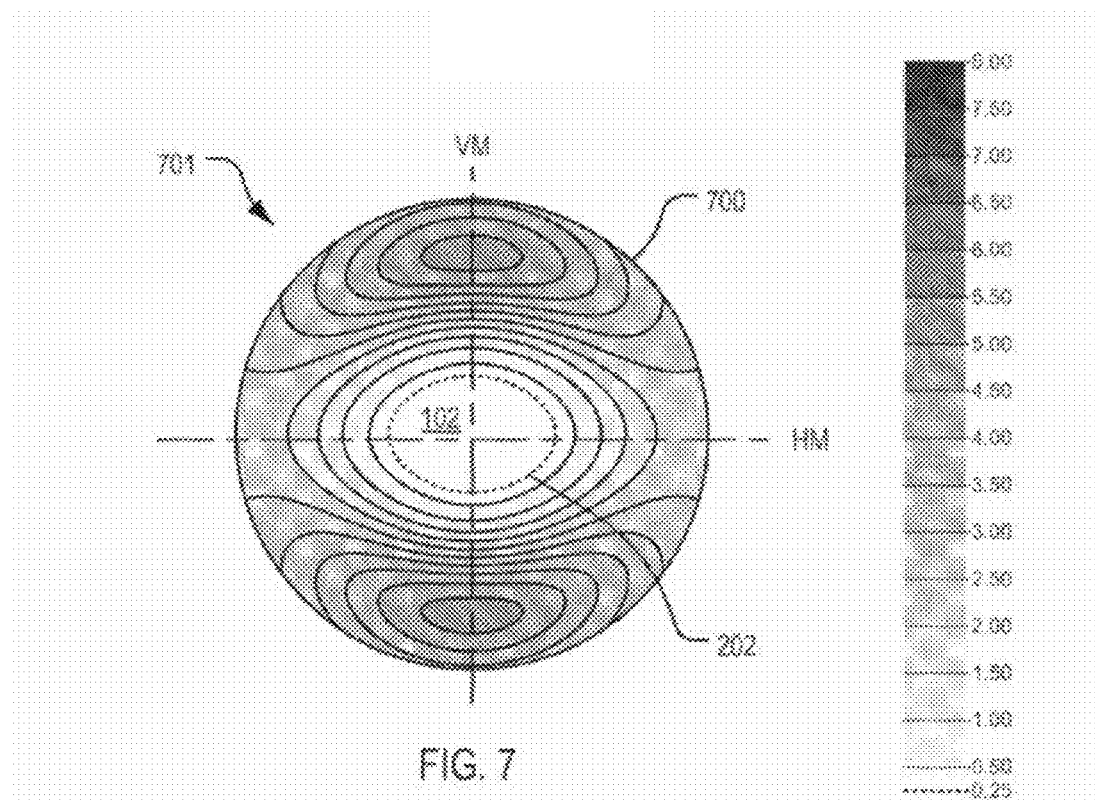
FIG. 7 is a contour diagram of surface mean addition power for an ophthalmic lens element according to a second embodiment having a diameter of 80 mm.
Figure 8:
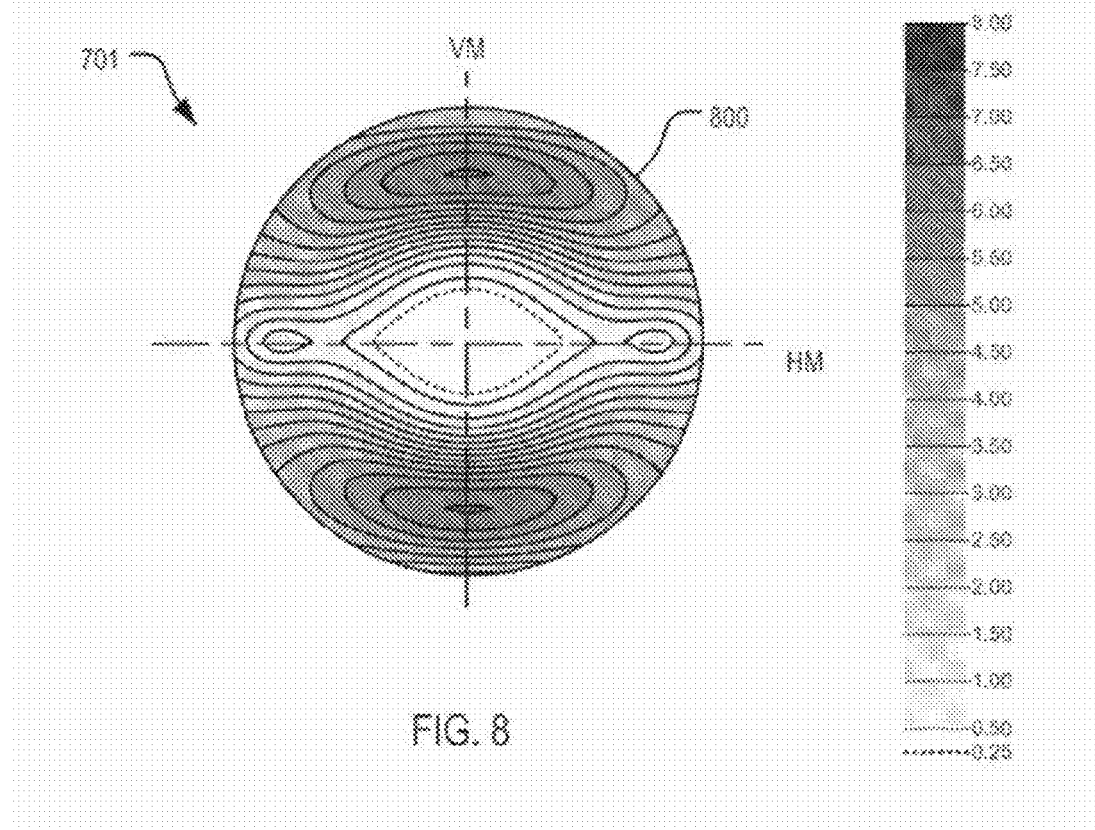
FIG. 8 is a contour diagram of surface astigmatism for the lens element of FIG. 7.

FIG. 7 illustrates a contour diagram 700 of surface mean power for another example of an ophthalmic lens element 701 according to an embodiment of the present invention. FIG. 8 illustrates a contour diagram 800 of surface astigmatism for the lens element 701.

Lens element 701 is similar to lens element 201 except that lens element 701 provides a larger central region 102 with lower astigmatism (that is, the region bounded by the 0.25 D contour 202 of mean surface power), but provides a distribution of astigmatism which is higher along the horizontal meridian (HM), as is evident in FIG. 8, but is still relatively low on the horizontal meridian (HM) in the central region and the progressive zones.

In this example, the lens element 701 includes a front surface having the same mean crown curvature as the lens 201 of Example 1, but the mean surface add power reaches 0.25 D only at the radius of 14 mm from the optical centre along the horizontal meridian, compared to 10 mm in the Example 1.

The mean curvature at 22 mm from the optical centre (OC) on the horizontal meridian is 4.40 D. As described above, lens element 701 provides a larger central region 102 than the lens element 201 of Example 1. In addition, and as is evident from comparing FIG. 7 with FIG. 2, the gradient of the mean surface power in the progressive zones 108, 110 of lens element 701 is steeper (that is, higher than) the corresponding gradient of lens element 201.

Figure 10:
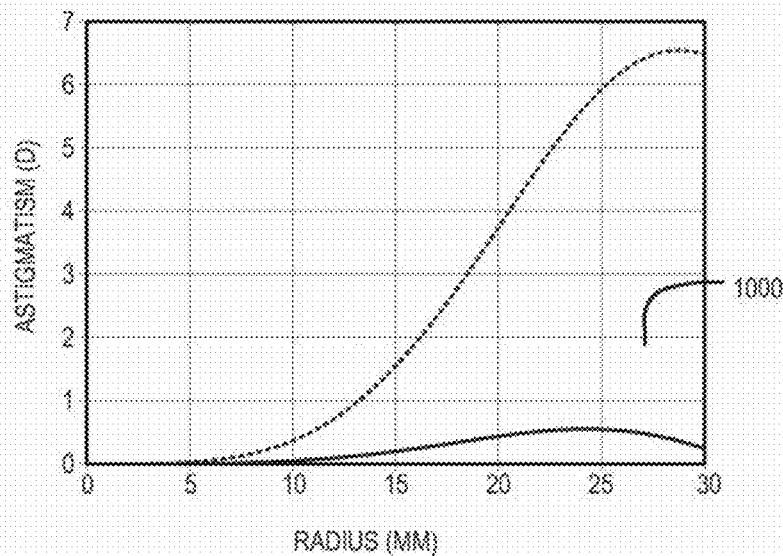
FIG. 10 is a graph representing values of front surface astigmatism along horizontal and vertical meridians for a lens element having the contour diagram shown in FIG. 7.

As shown in FIG. 8, the lens element 701 provides a distribution of surface astigmatism which provides a relatively low surface astigmatism on the horizontal meridian (HM) of the lens element in the central region and progressive zones. Indeed, and as shown in FIG. 10, in this example the maximum surface astigmatism at all points along a 30 mm radial section of the horizontal meridian (HM) is less than about 0.5 D (solid line). However, the astigmatism does increase slightly towards the perimeter of the lens element 701, outside of the progressive zones.

The front surface of the lens element 701 uses the same mathematical description as Example 1, but with the parameter values listed in table 2.

TABLE 2

| Parameter | Value |
|---|---|
| $R_0$ | 136.5 mm |
| t | 0 |
| $R_l$ | 176.67 mm |
| m | 0 |
| n | 0.0000013 |
| p | 3.75 |
| a | 1.0 |
| b | 1.35 |

Figure 9:
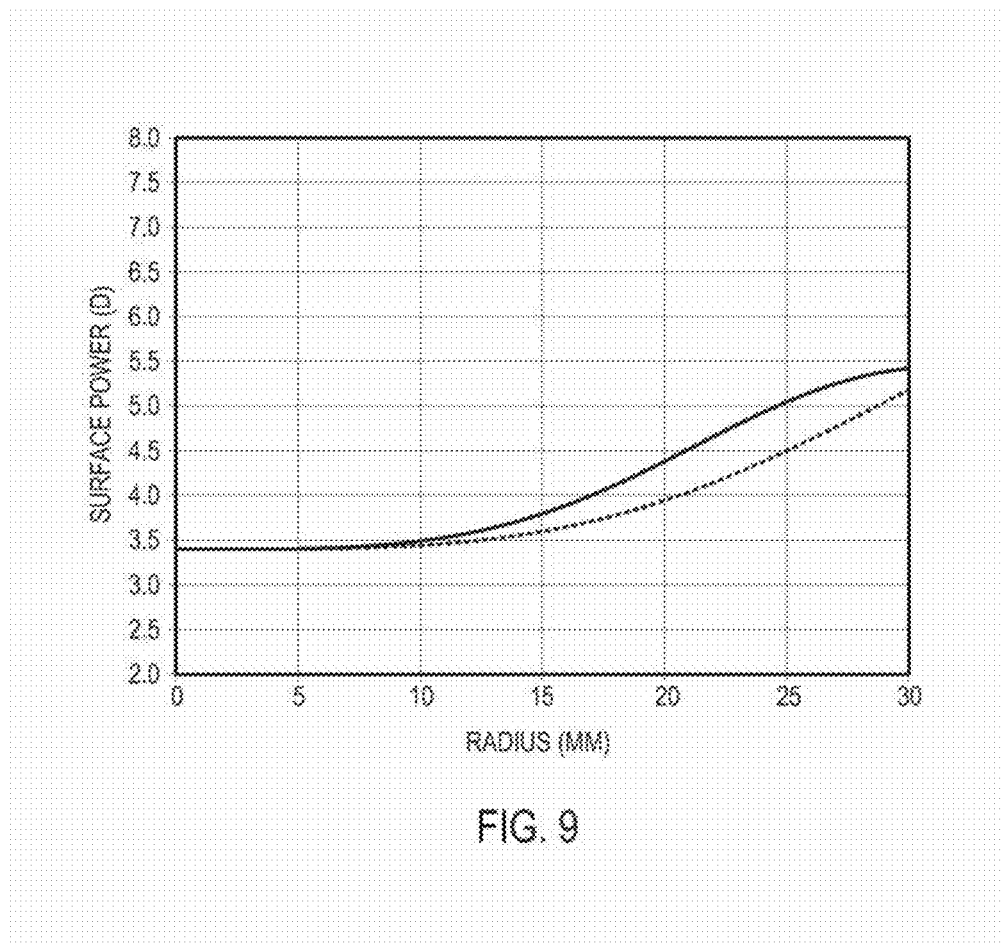
FIG. 9 is a graph representing values of tangential (solid line) and sagittal (dashed line) curvature along a horizontal meridian for a lens element having the contour diagram of surface mean addition power shown in FIG. 7.

Turning now to FIG. 9, there are shown two graphs representing values of tangential curvature (shown as a solid line) and sagittal curvature (shown as a dashed line) along a 30 mm radial extent of the horizontal meridian (HM) for a lens element 701 having the contour plot shown in FIG. 7.

As shown, the difference between the tangential and sagittal curvatures along the horizontal meridian (HM) is relatively small. Indeed, in the present example the error (in other words, the difference) between the tangential and sagittal curvature at all points along a 30 mm radial extent of the horizontal meridian (HM) is less than about 0.50 D.

Turning now to FIG. 10, graph 1000 shows values of astigmatism along a 30 mm radial extent of the horizontal meridian (HM). Compared to lens element 201, lens element 701 has reduced astigmatism in the central region (that is, out to a radial extent of 14 mm on the horizontal meridian), but provides increased astigmatism along the horizontal meridian (up to 0.5 D) at radial extents beyond 14 mm along the horizontal meridian (HM). However, in this example the astigmatism is still relatively low beyond 14 mm.

Figure 11:
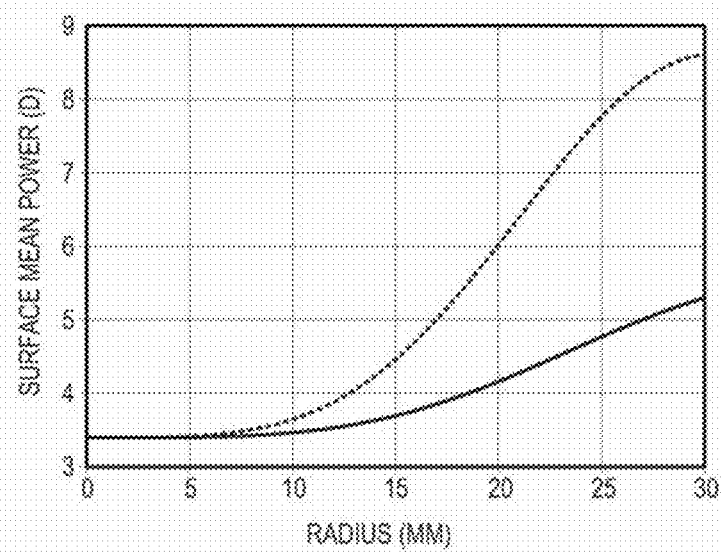
FIG. 11 is a graph representing values of front surface mean power along horizontal and vertical meridians for a lens element having the contour diagram shown in FIG. 7.

FIG. 11 includes two graphs mapping values of front surface mean power along a 30 mm radial extent of the vertical meridian (with the values of surface mean power represented as a dashed line) and a 30 mm radial extent of the horizontal meridian (the values of surface mean power represented as a solid line). As shown, the front surface of the lens element 701 provides a gradual increase in surface mean power along both the vertical meridian (VM) and the horizontal meridian (HM). However, the increase in surface mean power along the horizontal meridian (HM) is not as significant as that which occurs along the vertical meridian (VM).

Example 3

Figure 12:
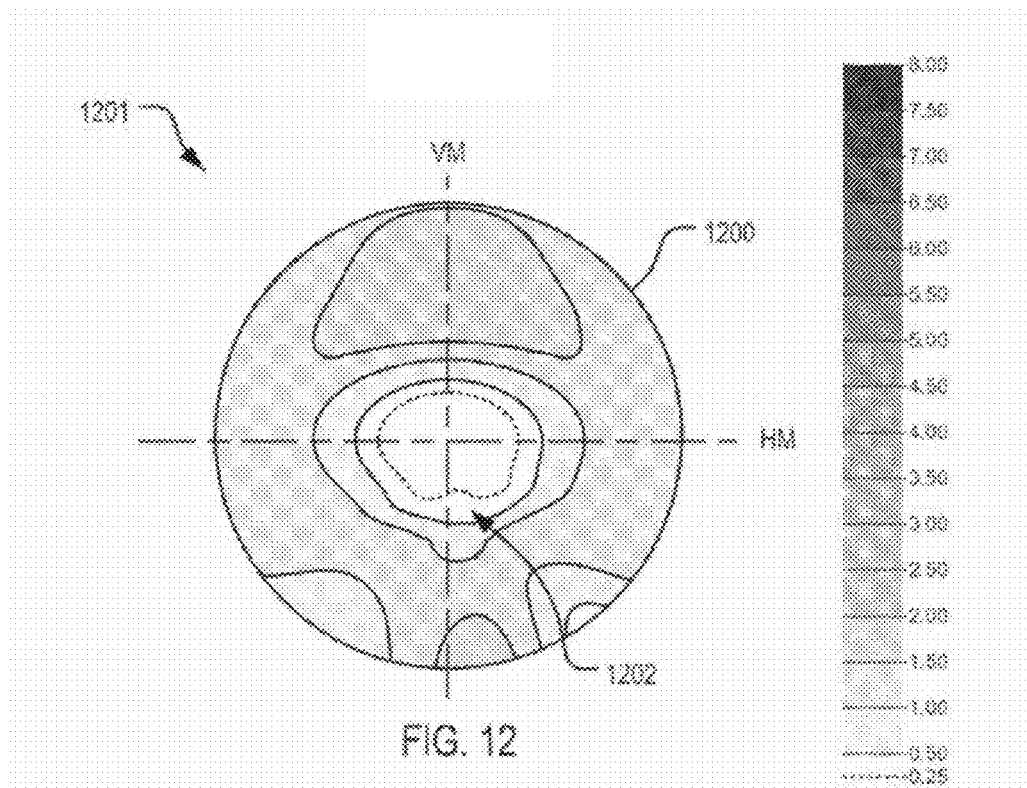
FIG. 12 is a contour diagram of surface mean addition power for an ophthalmic lens element according to a third embodiment having a diameter of 80 mm.
Figure 13:
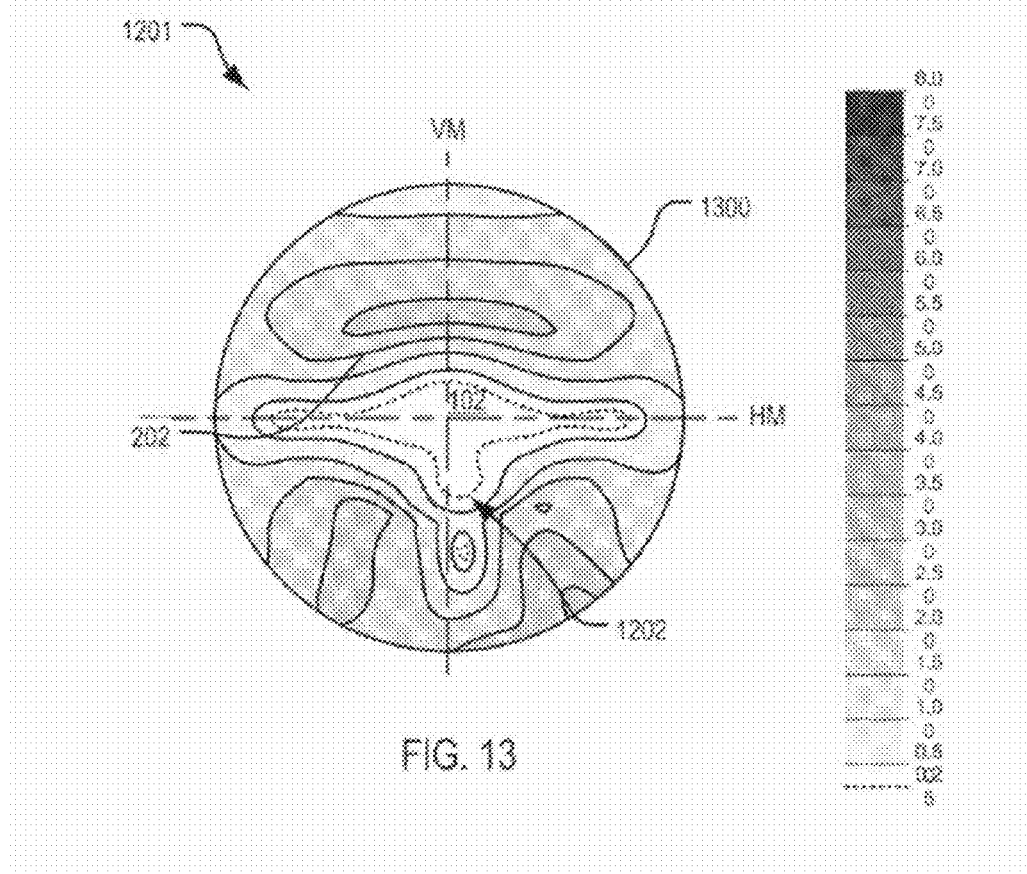
FIG. 13 is a contour diagram of surface astigmatism for the lens element of FIG. 12.

FIG. 12 illustrates a contour diagram 1200 of surface mean addition power for another example of an ophthalmic lens element 1201 according to an embodiment of the present invention. FIG. 13 illustrates a contour diagram 1300 of surface astigmatism for the lens element 1201. In this example, the lens element 1201 includes a front surface having a higher mean crown curvature (3.53 D) than the lens element 201 of Example 1.

Lens element 1201 also provides a central region 102 that has been modified with respect to that of the lens element 201 of Example 1. In particular, the central region 102 of lens element 1201 provides an inset viewing area which is substantially free of astigmatism, but that does not have any addition power. The inset area 1202 is shown in FIG. 12 and is more clearly depicted in FIG. 13.

The front surface of the lens element 1201 uses the same mathematical description as Example 1, but with the parameter values listed in table 3. However, in this example tangential power in the upper and lower regions of the lens element 1200 has been reduced by applying a quadratic extrapolation of the type described earlier outside an oval of 60 mm×35 mm centred on the optical centre (OC) to reduce the maximum tangential addition power to about 3 D.

TABLE 3

| Parameter | Value |
| --- | --- |
| $R_0$ | 136.5 mm |
| t | 0 |
| $R_I$ | 176.67 mm |
| m | 0 |
| n | 0.00015 |
| p | 2.44 |
| a | 1.0 |
| b | 1.35 |

Figure 14:
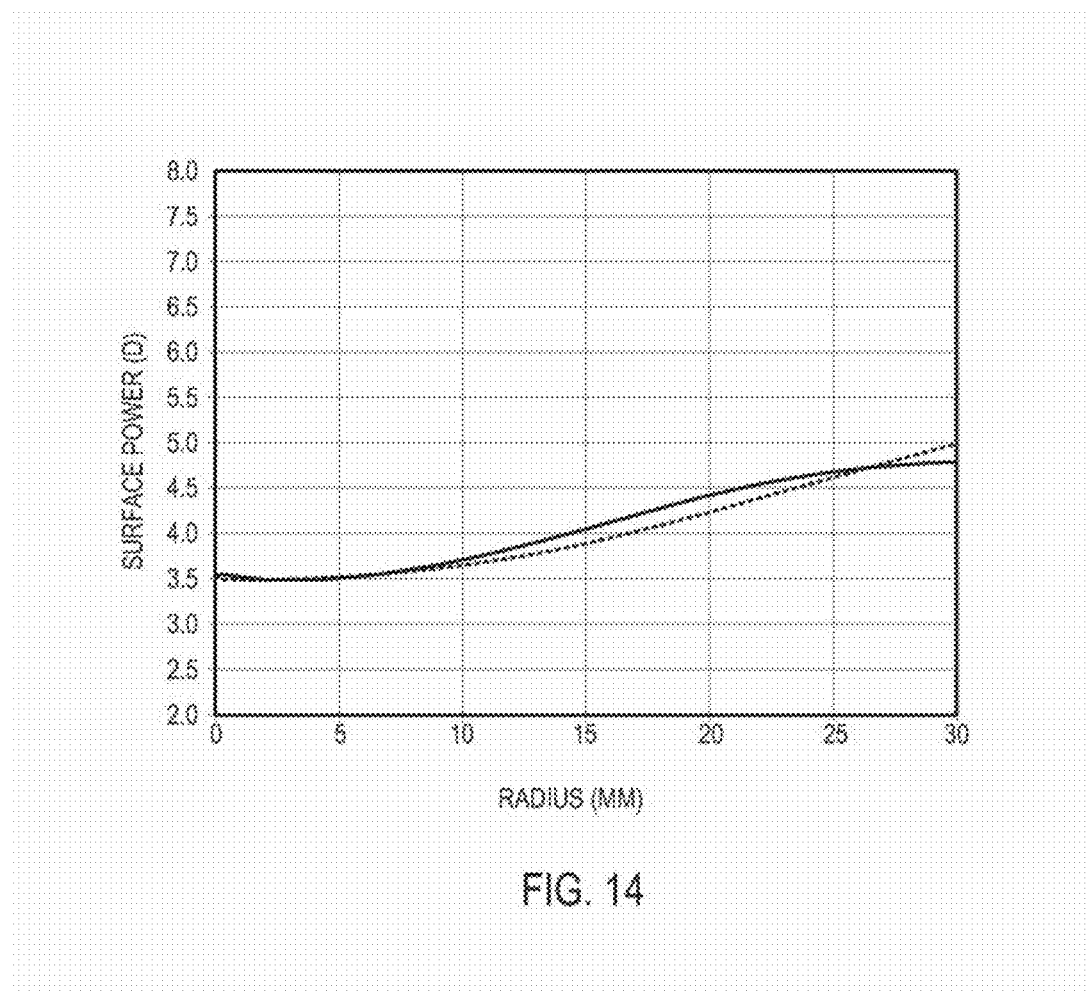
FIG. 14 is a graph representing values of tangential (solid line) and sagittal (dashed line) curvature along a horizontal meridian for a lens element having the contour diagram of surface mean addition power shown in FIG. 12.

FIG. 14 shows two graphs representing values of tangential curvature (shown as a solid line) and sagittal curvature (shown as a dashed line) at points along a 30 mm radial along the horizontal meridian (HM) for a lens element 1201 having the contour diagrams shown in FIG. 12 and FIG. 13.

As shown, the difference between the tangential and sagittal curvature along the 30 mm radial of the horizontal meridian (HM) is relatively small. Indeed, in the present example the error (in other words, the difference) between the tangential and sagittal curvature is less than about 0.25 D.

Figure 15:
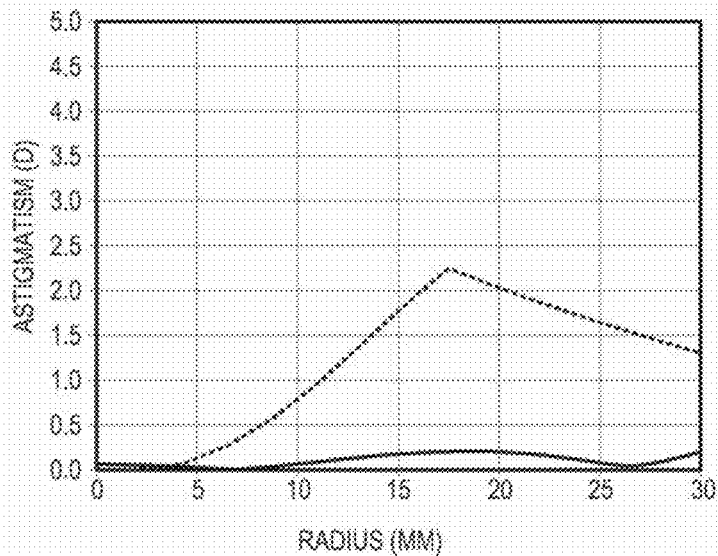
FIG. 15 is a graph representing values of front surface astigmatism along horizontal and vertical meridians for a lens element having the contour diagram shown in FIG. 13.
Figure 16:
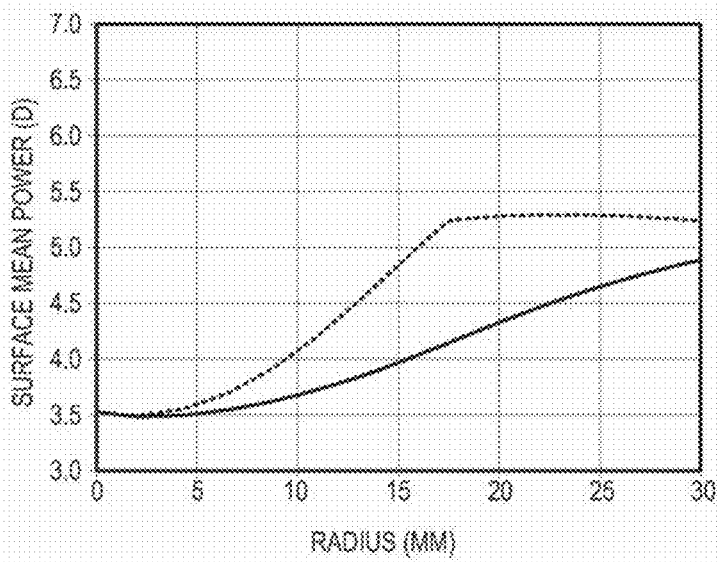
FIG. 16 is a graph representing values of front surface mean power along horizontal and vertical meridians for a lens element having the contour diagram of surface mean addition power shown in FIG. 12.

FIG. 15 and FIG. 16 show graphs of front surface astigmatism and front surface mean power respectively along the vertical meridian (shown as dashed lines) and the horizontal meridian (shown as solid lines). As shown in FIG. 16, the lens element 1201 provides a mean surface power at 12 mm from the optical centre (OC) along the horizontal meridian, of 3.54 D. Compared to the previous examples, lens element 1201 provides a lower plus power of 0.92 D at 22 mm.

The mean surface power at 22 mm from the optical centre (OC) on the horizontal meridian (HM) is 4.46 D. As shown in FIG. 16, the lens element provides relatively low astigmatism on the horizontal meridian (HM) in the central region 102 (that is, the region bounded by the 0.25 D contour 202 of mean surface addition power) and the progressive zones.

Example 4

Figure 17:
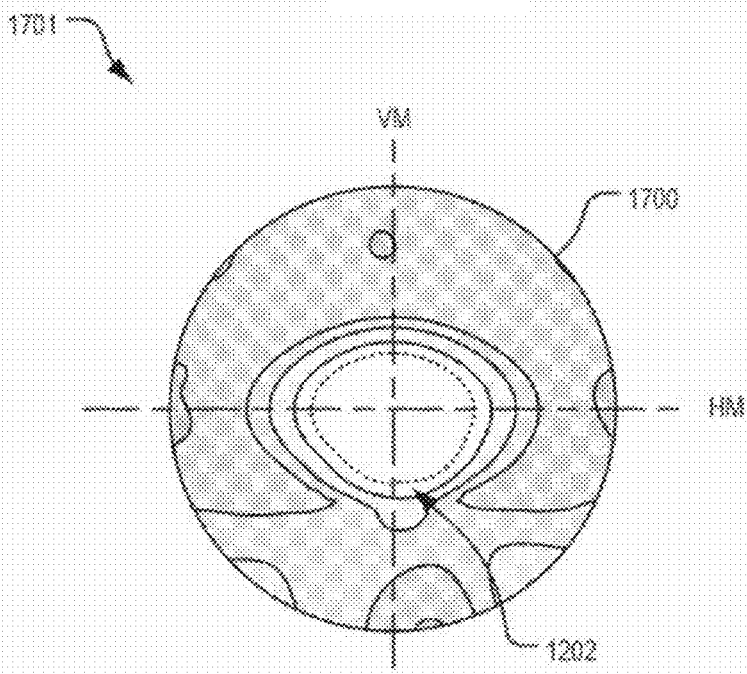
FIG. 17 is a contour diagram of surface mean addition power for an ophthalmic lens element according to a fourth embodiment having a diameter of 80 mm.
Figure 18:
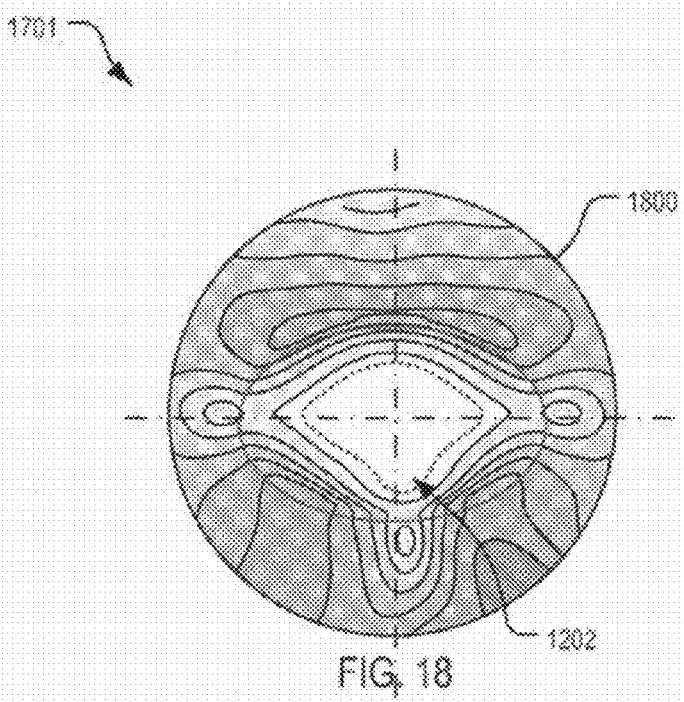
FIG. 18 is a contour diagram of surface astigmatism for the lens element of FIG. 17.
Figure 19:
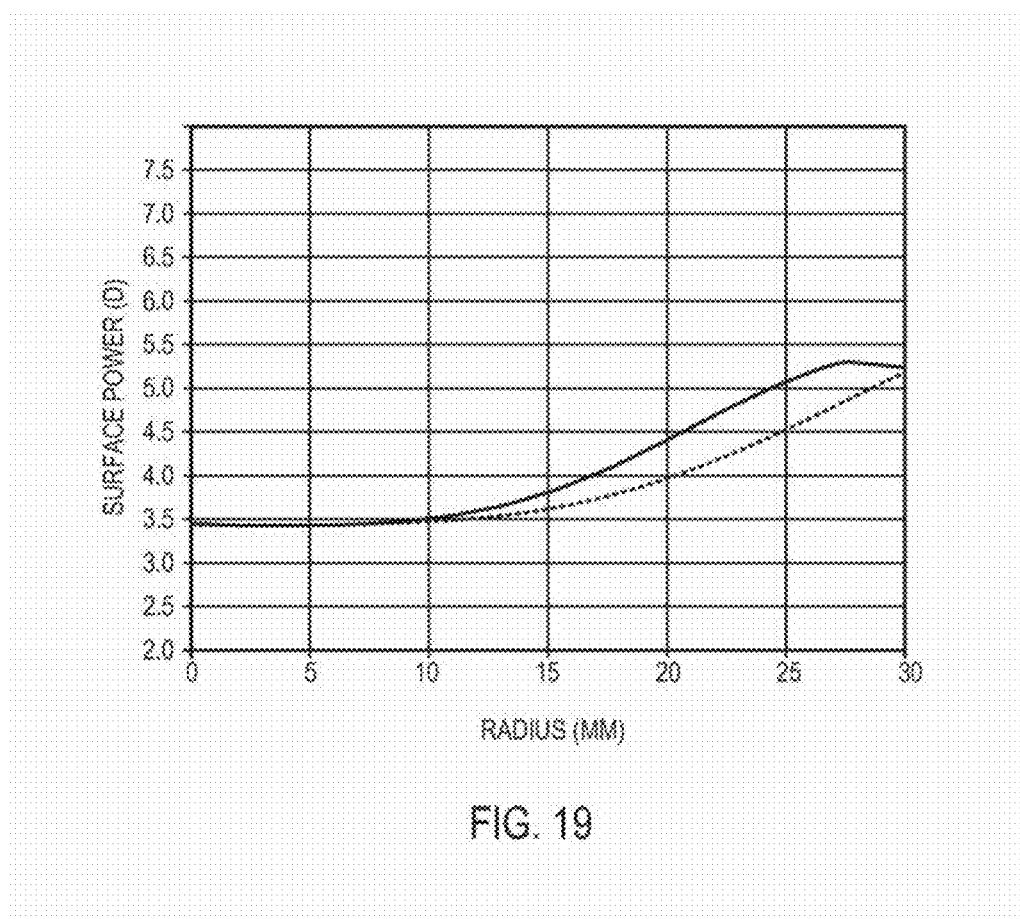
FIG. 19 is graph representing values of tangential (solid line) and sagittal (dashed line) curvature along a horizontal meridian for a lens element having the contour diagram of surface mean addition power shown in FIG. 17.

FIG. 17 illustrates a contour diagram 1700 of surface mean addition power for another example of an ophthalmic lens element 1701 according to an embodiment of the present invention. FIG. 18 illustrates a contour diagram 1800 of surface astigmatism for the lens element 701.

As evident from FIG. 17 to FIG. 21, lens element 1701 is similar to lens element 1201 in that it also includes an inset viewing area 1202 which is substantially free of astigmatism, but that does not have any addition power. The inset area 1202 is shown in FIG. 17 and is more clearly depicted in FIG. 18.

The front surface of the lens element 1701 uses the same mathematical description as Example 1, but with the parameter values listed in table 4.

TABLE 4

| Parameter | Value |
| --- | --- |
| $R_0$ | 136.5 mm |
| T | 0 |
| $R_I$ | 176.67 mm |
| M | 0 |
| N | 0.0000013 |
| P | 3.75 |
| A | 1.0 |
| B | 1.35 |

Example 5

Figure 22:
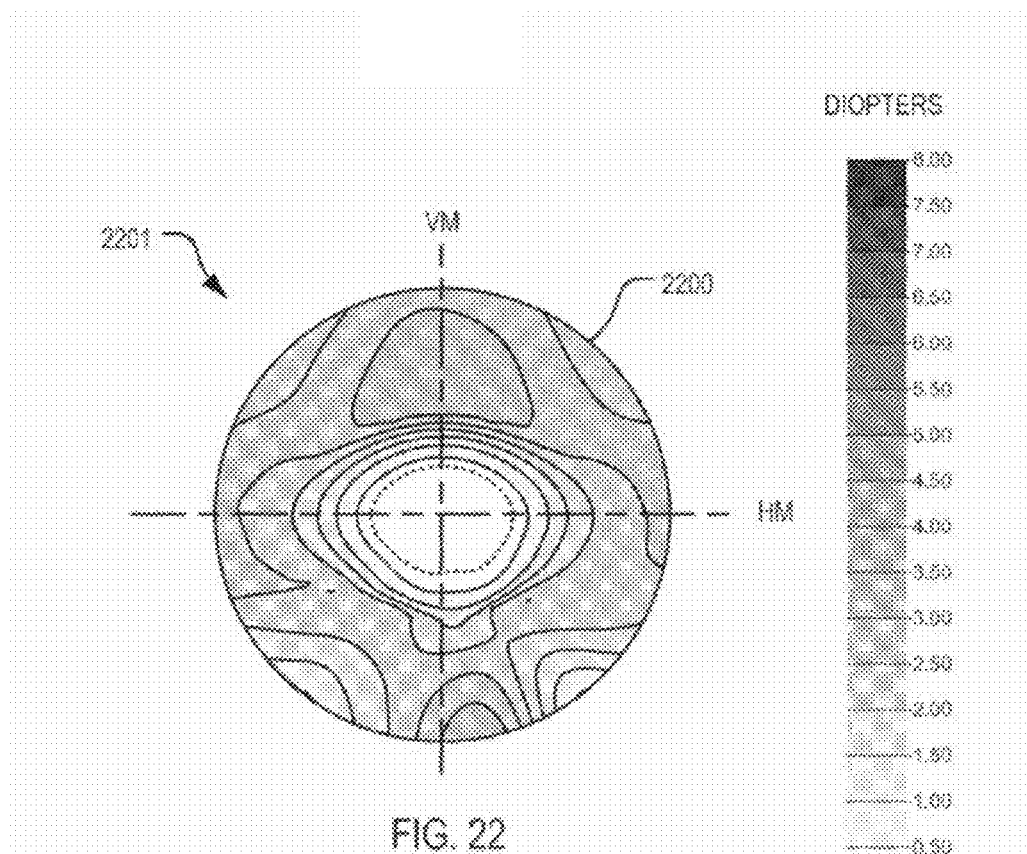
FIG. 22 is a contour diagram of surface mean addition power for an ophthalmic lens element according to a fifth embodiment having a diameter of 80 mm.
Figure 23:
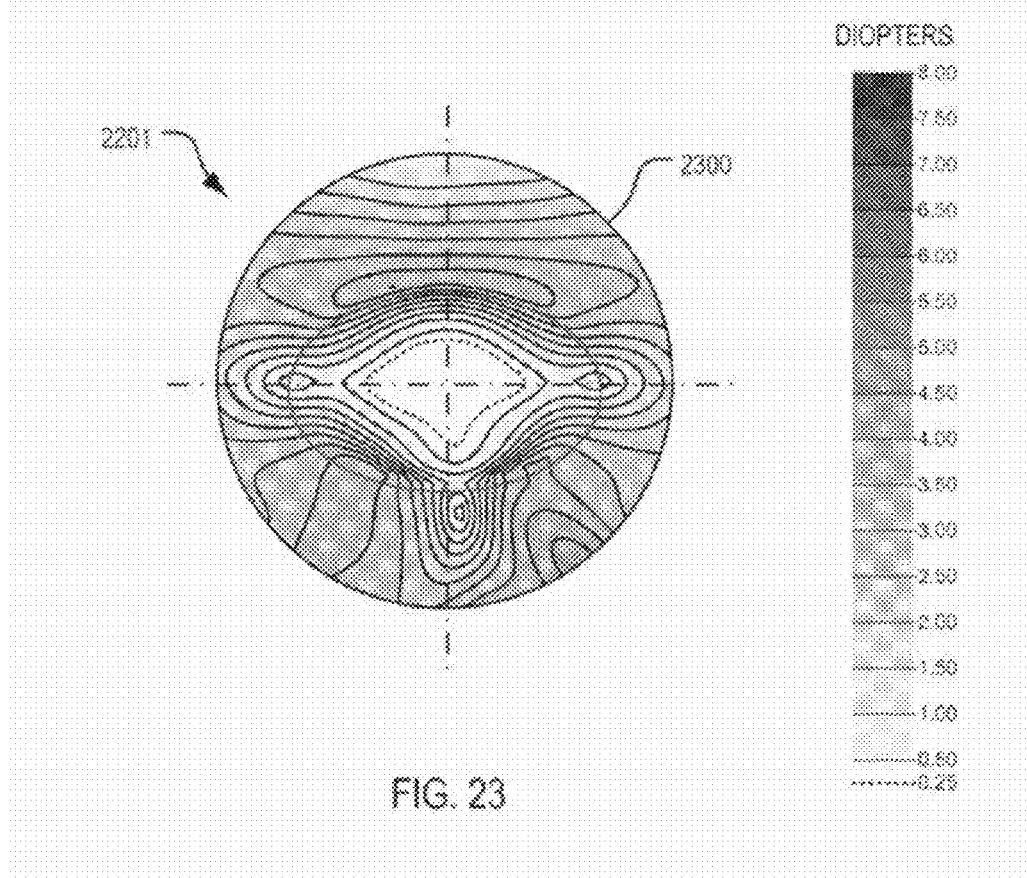
FIG. 23 is a contour diagram of surface astigmatism for the lens element of FIG. 22.
Figure 24:
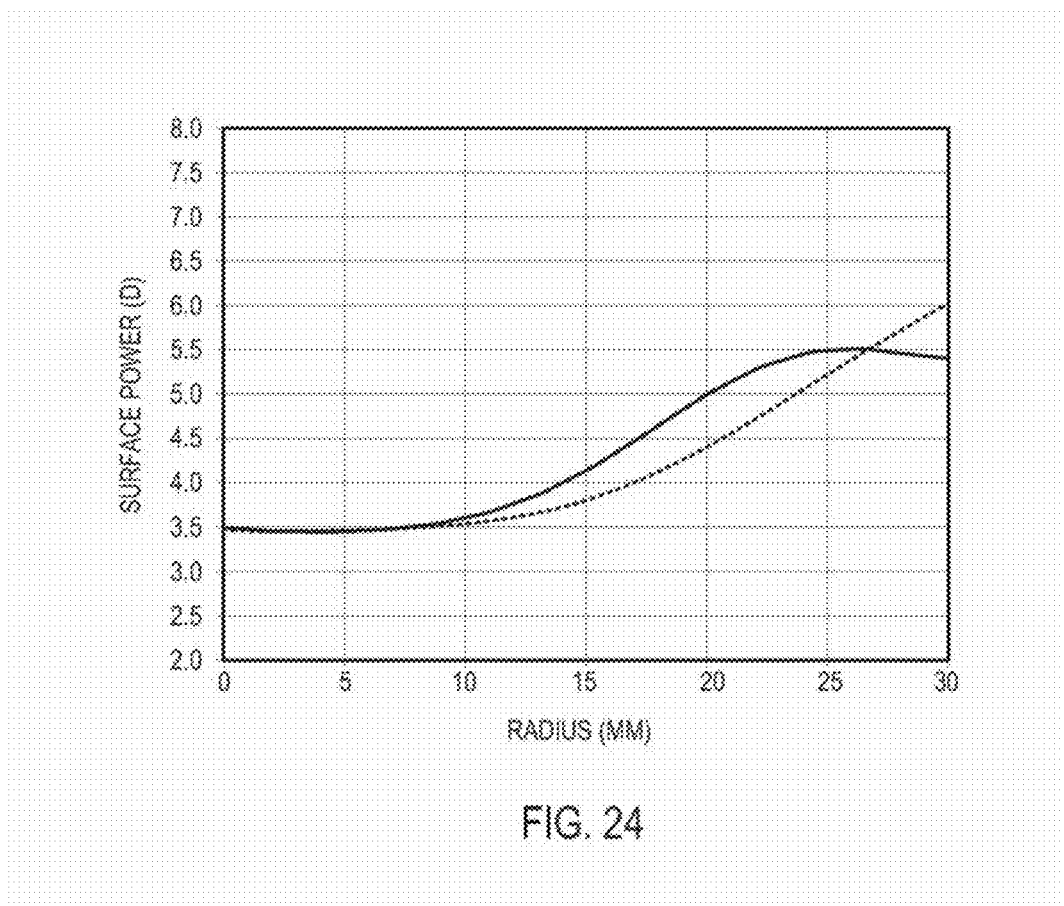
FIG. 24 is graph representing values of tangential (solid line) and sagittal (dashed line) curvature along a horizontal meridian for a lens element having the contour diagram surface mean addition power shown in FIG. 22.
Figure 25:
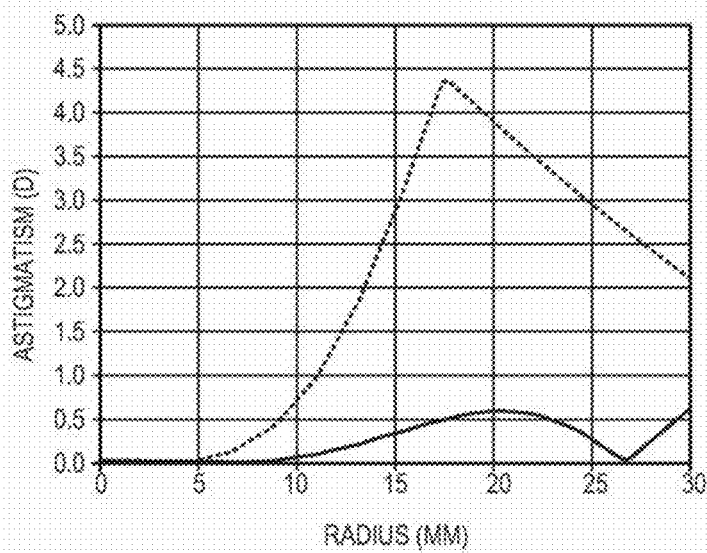
FIG. 25 is a graph representing values of front surface astigmatism along horizontal and vertical meridians for a lens element having the contour diagram shown in FIG. 23.

FIG. 22 illustrates a contour diagram 2200 of surface mean addition power for another example of an ophthalmic lens element 2201 according to an embodiment of the present invention. FIG. 23 illustrates a contour diagram 2300 of surface astigmatism for the lens element 2201.

Figure 20:
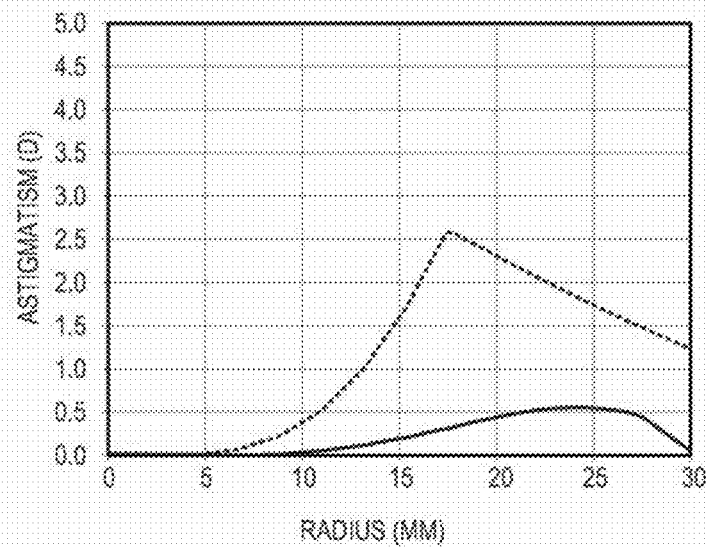
FIG. 20 is a graph representing values of front surface astigmatism along horizontal and vertical meridians for a lens element having the contour diagram shown in FIG. 18.
Figure 21:
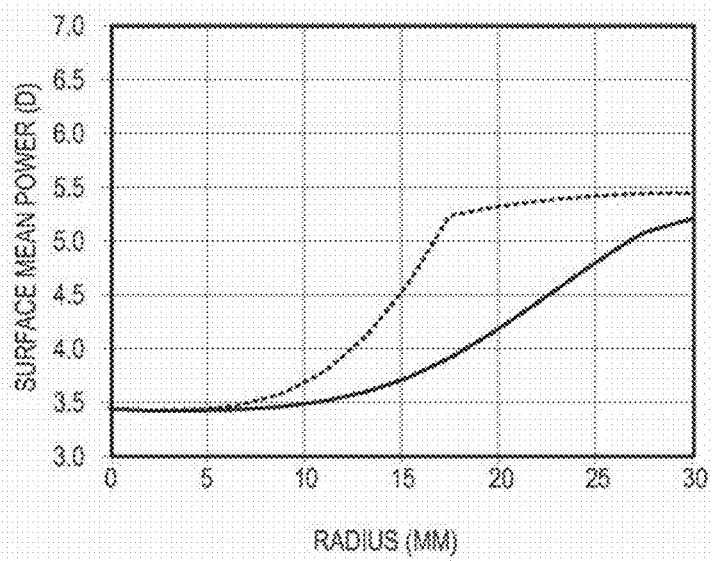
FIG. 21 is a graph representing values of front surface mean power along horizontal and vertical meridians for a lens element having the contour diagram shown in FIG. 17.

As is evident from FIG. 22 to FIG. 26, lens element 2201 is similar to lens element 1701. However, and as is evident from a comparison of FIG. 21 with FIG. 26, lens element 2201 provides an increase (of about 50%) in addition power at 22 mm from the optical centre along the horizontal meridian (HM). However, as shown in FIG. 20, the astigmatism is still relatively low on the horizontal meridian in central region 102 and the progressive zones.

The front surface of the lens element 2201 uses the same mathematical description as Example 1, but with the parameter values listed in Table 5.

TABLE 5

| Parameter | Value |
| --- | --- |
| $R_0$ | 136.5 mm |
| T | 0 |
| $R_I$ | 176.67 mm |
| M | 0 |
| N | 0.0000013 |
| P | 3.83 |
| a | 1.0 |
| B | 1.35 |

Example 6

With reference now to FIG. 27 to FIG. 31, a lens element 2701 according to an embodiment of the present invention was designed having a 8.1 D (in 1.53 index) base curve and a diameter of 80 mm. In other words, the lens element 2701 provides a relatively higher base curve than the earlier described examples.

A relatively higher base curve may provide a power profile of peripheral mean power which provides a reduced hyperopic shift in the inner peripheral region of a wearer's retina as compared to the previously described examples. Furthermore, a lens element with a relatively higher base curve may be suitable for use with highly curved frames (for example, "wrapped" frames) and enhance the area of peripheral retina exposed to images formed by the lens element. Suitable relatively higher base curve for a wearer may be determined using static eye ray tracing techniques which would be well known to a skilled addressee.

The illustrated lens element 2701 has a mean crown curvature of about 9.17 D, and a mean curvature of about 9.57 D (in the index of the material 1.600) at 12 mm from the optical centre (OC) along the horizontal meridian. The mean curvature of the lens element 2701 at 22 mm from the optical centre, along the horizontal meridian, is about 10.69 D (in the index of the material 1.600).

The front surface of the lens element 2701 uses the same mathematical description as Example 1, but with the parameter values listed in table 6.

TABLE 6

| Parameter | Value |
| --- | --- |
| $R_0$ | 62.0 mm |
| t | 0 |
| $R_I$ | 66.25 mm |

TABLE 6-continued

| Parameter | Value |
| --- | --- |
| m | 0 |
| n | 0.000005 |
| p | 3.85 |
| a | 1.0 |
| b | 1.2 |

Figure 27:
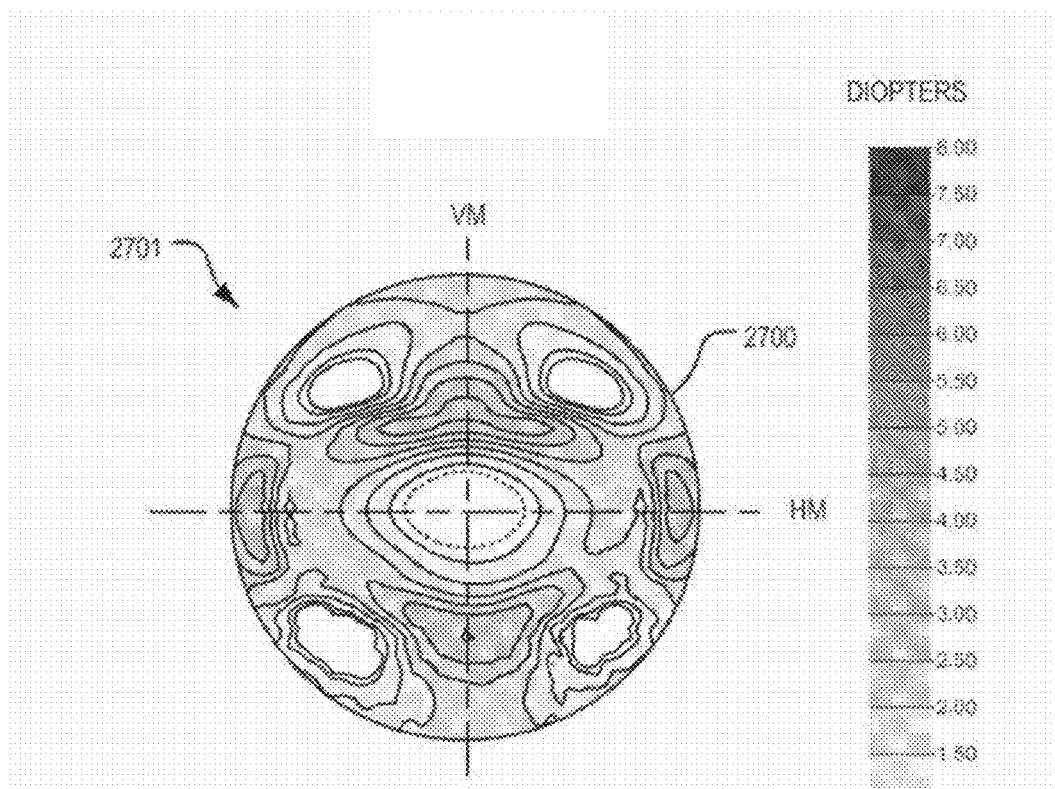
FIG. 27 is a contour diagram of surface mean addition power for an ophthalmic lens element according to a sixth embodiment having a diameter of 80 mm.
Figure 28:
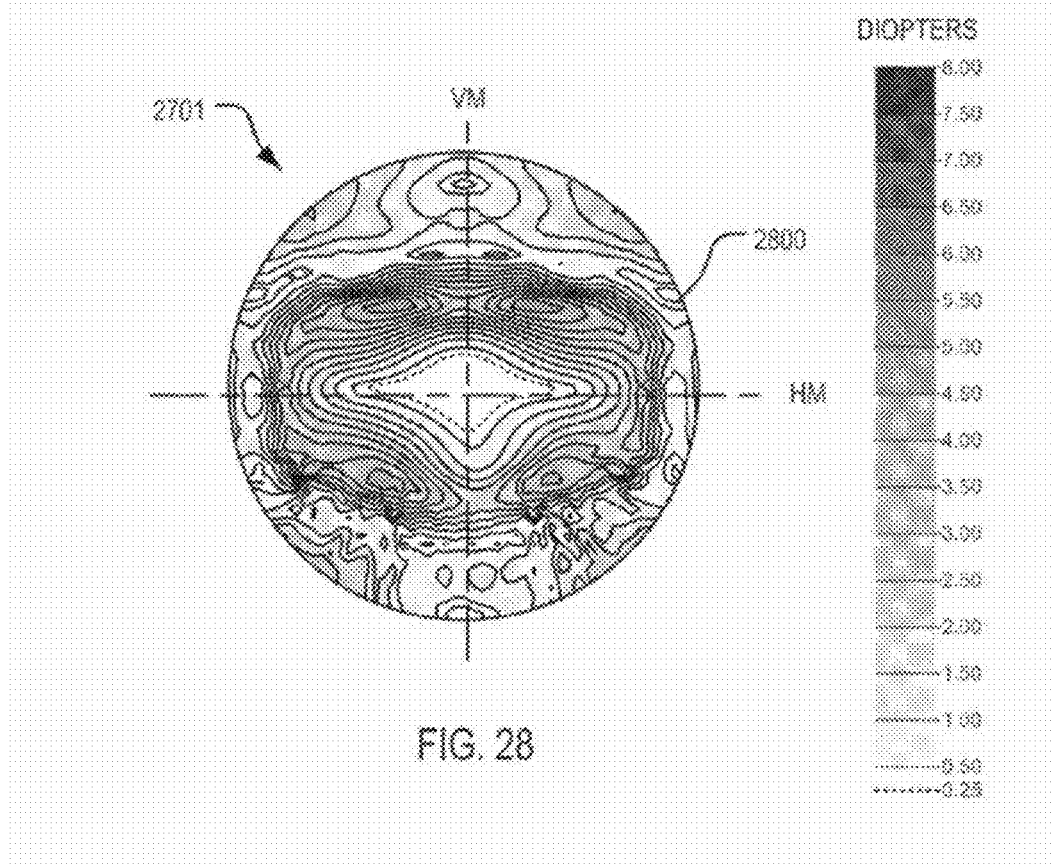
FIG. 28 is a contour diagram of surface astigmatism for the lens element of FIG. 27.

FIG. 27 illustrates a contour diagram 2200 of surface mean addition power for the ophthalmic lens element 2701. FIG. 28 illustrates a contour diagram 2800 of surface astigmatism for the lens element 2701.

Figure 29:
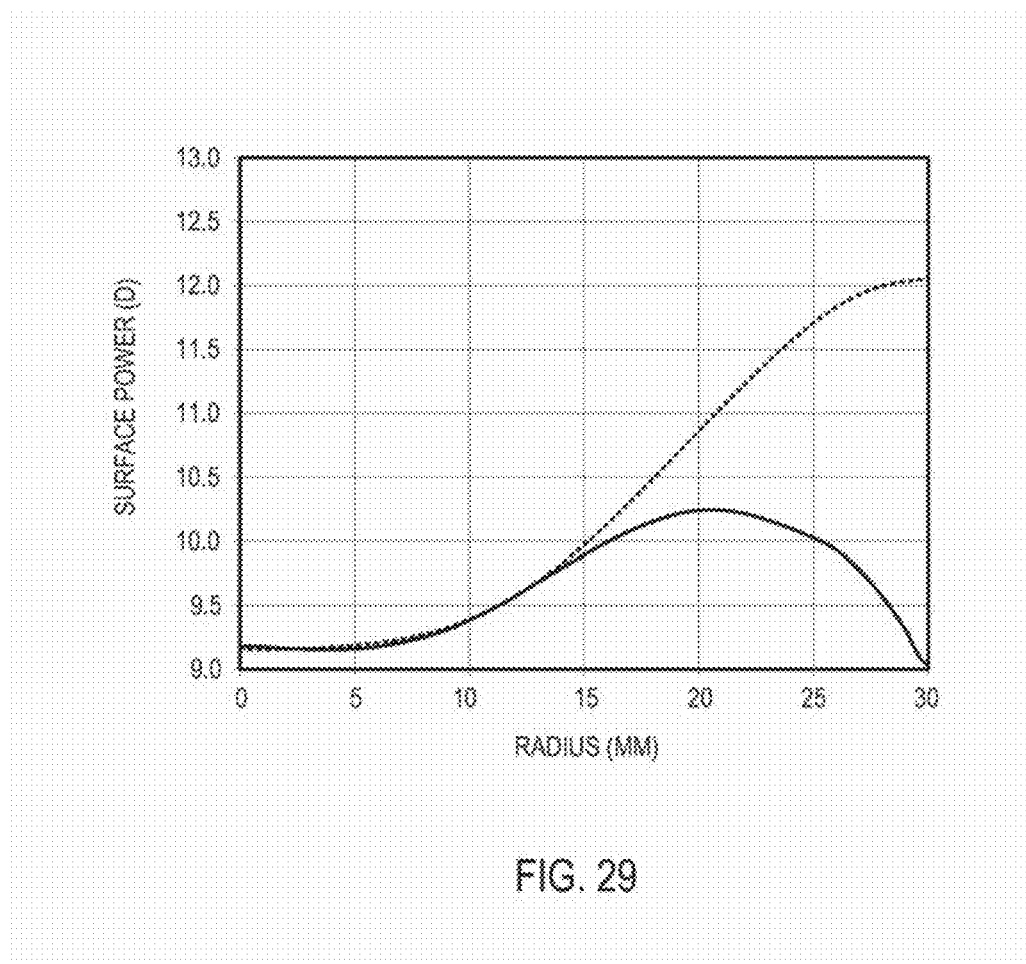
FIG. 29 is graph representing values of tangential (solid line) and sagittal (dashed line) curvature along a horizontal meridian for a lens element having the contour diagram surface mean addition power shown in FIG. 27.

FIG. 29 shows a plot of tangential (solid line) and sagittal (dashed line) power along the horizontal of the meridian of the lens on the horizontal meridian (HM) from the optical centre out to a radial extent of 30 mm of the lens element 2701. In contrast to the earlier described examples, the lens element 2701 provides a sagittal power which "leads" the tangential power along the horizontal meridian beyond a radial extent of about 15 mm from the optical centre. In other words, beyond a radial extent of about 15 mm from the optical centre, the sagittal power is greater than the tangential power. Indeed in the present example, the difference in sagittal power and the tangential power progressively increases between about 15 mm and 30 mm from the optical centre. Below 15 mm the difference between the sagittal power and the tangential power is less than 0.5 D.

The lens element 2701 of the present example displays "against the rule" astigmatism (that is, astigmatism in the sagittal or circumferential direction) along the horizontal meridian beyond about 15 mm from the optical centre. This is in contrast with rotationally symmetric aspheric minus powered lenses with relative plus power in the periphery which exhibit "with the rule" astigmatism (that is, astigmatism in the radial direction) which tends to magnify the peripheral astigmatism on the retina.

Figure 30:
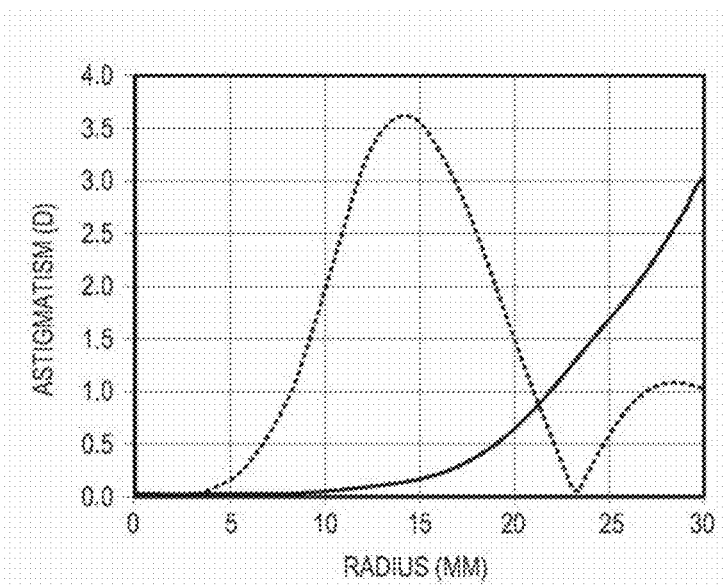
FIG. 30 is a graph representing values of front surface astigmatism along horizontal and vertical meridians for a lens element having the contour diagram shown in FIG. 27.

As shown in FIG. 29, the lens element 2701 displays a refractive error which contributes to sagittal astigmatism (ref. FIG. 30) along the horizontal meridian (ref. dashed line) beyond about 15 mm from the optical centre, but is relatively low for values less than 15 mm. A radial extent of 15 mm approximates to a field angle of about 30°.

In the present example, the introduction of the sagittal astigmatism along the horizontal meridian beyond about 15 mm from the optical centre is intentional and may compensate for peripheral eye astigmatism which may be observed in a typical eye.

As with the previously described examples, the lens element 2701 of this example seeks to minimise the peripheral astigmatism created by the lens element 2701 along the horizontal meridian by positioning both the tangential and the sagittal focus plane on or in front of the retina and thereby provide a more effective stop signal for myopia retardation.

Figure 26:
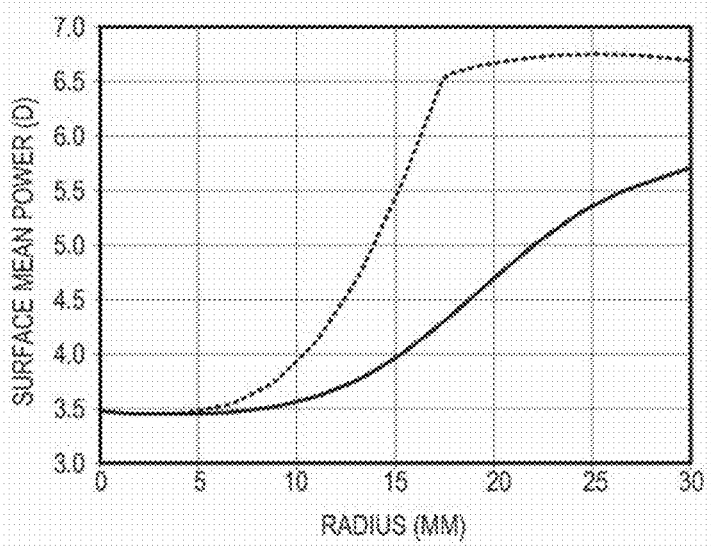
FIG. 26 is a graph representing values of front surface mean power along horizontal and vertical meridians for a lens element having the contour diagram of surface mean addition power shown in FIG. 22.
Figure 31:
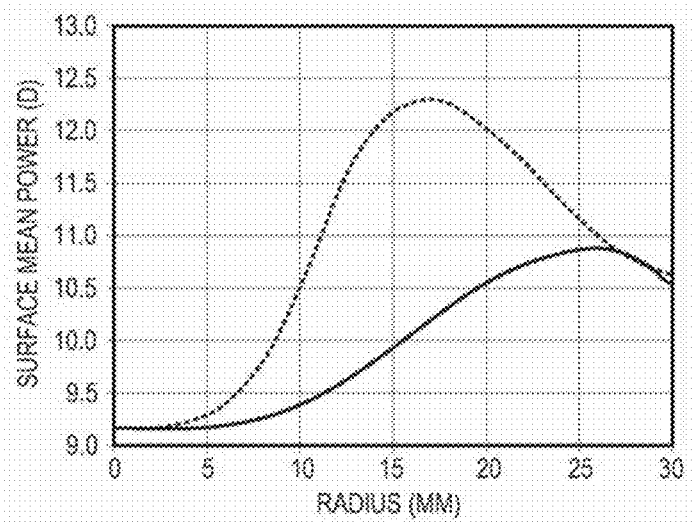
FIG. 31 is a graph representing values of front surface mean power along horizontal and vertical meridians for a lens element having the contour diagram of surface mean addition power shown in FIG. 27.

Turning now to FIG. 31, the surface mean power of the lens element 2701 along the horizontal meridian (shown as a solid line) rises faster as compared to the corresponding surface mean power profile of the lens element of Example 5 (see for example, FIG. 26). However, as is evident from a comparison of FIG. 26 and FIG. 31, the surface mean power of lens element 2701 along the horizontal median does not rise as high in the peripheral region as compared to the lens element 2201.

It will be understood that there may be other variations and modifications to the configurations described herein that are also within the scope of the present invention.

The invention claimed is:

1. An ophthalmic lens element including a front surface and a rear surface, at least one of the surfaces including a horizontal meridian and a vertical meridian, the lens element including:
a central region including a foveal vision zone providing a first power for providing clear foveal vision for a wearer; and
a peripheral region of positive power relative to the first power, the peripheral region including dual progressive zones located bilaterally of the vertical meridian and extending radially outwardly from the central region;
wherein the lens element provides a distribution of surface astigmatism which provides, on the horizontal meridian, a relatively low surface astigmatism in the central region and the progressive zones.

2. An ophthalmic lens element according to claim 1 wherein each progressive zone provides a mean power profile along a respective horizontal semi-meridian that provides a positive power gradient over a range defined by $r_a \leq r_x \leq r_b$ in which $r_a$ and $r_b$ are radial distances along each horizontal semi-meridian from the optical centre of the lens.

3. An ophthalmic lens element according to claim 1 wherein the first power is a prescribed power for providing an optical correction corresponding to a wearer's on-axis distance vision viewing requirements.

4. An ophthalmic lens element according to claim 1 wherein the positive power in the progressive zones provides an optical correction for retarding or arresting myopia associated with a peripheral region of the retina along the horizontal meridian of the wearer's eye.

5. An ophthalmic lens element according to a claim 2 wherein the range defined by $r_a \leq r_x \leq r_b$ is substantially 10 mm $\leq r_x \leq$ 22 mm.

6. An ophthalmic lens element according to claim 2 wherein the positive gradient over the range $r_a \leq r_x \leq r_b$ provides a positive mean power increase of at least 1.00 D relative to the refracting power at the optical centre of the lens element.

7. An ophthalmic lens element according to claim 2 wherein the positive gradient over the range $r_a \leq r_x \leq r_b$ provides a positive mean power increase of at least 1.50 D relative to the refracting power at the optical centre of the lens element.

8. An ophthalmic lens element according to claim 2 wherein the positive gradient over the range $r_a \leq r_x \leq r_b$ provides a positive mean power increase of at least 2.00 D relative to the refracting power at the optical centre of the lens element.

9. An ophthalmic lens element according to claim 2 wherein the positive gradient over the range $r_a \leq r_x \leq r_b$ provides a positive mean power increase of at least 2.50 D relative to the refracting power at the optical centre of the lens element.

10. An ophthalmic lens element according to claim 2 wherein the positive gradient over the range $r_a \leq r_x \leq r_b$ provides a positive mean power increase of at least 3.00 D relative to the refracting power at the optical centre of the lens element.

11. An ophthalmic lens element according to claim 2 wherein $r_a$ corresponds with a boundary between the foveal vision zone and the progressive zones defined by a +0.25 D contour of mean surface power on the mean power profile.

12. An ophthalmic lens element according to claim 2 wherein the difference between $r_a$ and $r_b$ is not less than substantially 8 mm.

13. An ophthalmic lens element according to claim 2 wherein the first power is in the range from plano to −4.00 D.

14. An ophthalmic element according to claim 1 wherein the foveal vision zone includes an aperture having a shape and/or size that corresponds with the extent of a wearer's typical eye rotations before they engage head rotation.

15. A series of ophthalmic lens elements according to claim 1 wherein each lens in the series provides a peripheral region having a range of positive mean power corresponding with different peripheral correction requirements.

16. A series of ophthalmic lens elements according to claim 15 wherein for each lens in the series the size and/or shape of the central region is associated with a predetermined range of eye rotations for the wearer.

17. An ophthalmic lens element including a lens surface having:
   a horizontal meridian and a vertical meridian;
   a central region including a foveal vision zone providing a surface power to achieve a refracting power for providing clear foveal vision for a wearer; and
   a peripheral region of positive surface mean power relative to the surface power of the central region, the peripheral region including dual progressive zones located bilaterally of the vertical meridian and extending radially outwardly along the horizontal meridian from the central region, each progressive zone providing a gradual increase in surface mean power from the surface power of the central region;
   wherein the lens surface provides a distribution of surface astigmatism which provides, along the horizontal meridian, a relatively low surface astigmatism in the central region and the progressive zones.

18. An ophthalmic lens element according to claim 17 wherein each progressive zone provides a mean surface power profile along a respective horizontal semi-meridian that provides a positive surface power gradient over a range defined by $r_a \leq r_x \leq r_b$ in which $r_a$ and $r_b$ are radial distances along each horizontal semi-meridian from the optical centre of the lens.

19. An ophthalmic lens element according to claim 17 wherein the refracting power is a prescribed power for providing an optical correction corresponding to a wearer's on-axis distance vision viewing requirements.

20. An ophthalmic lens element according to claim 17 wherein the positive surface power in the progressive zones provides an optical correction for retarding or arresting myopia associated with a peripheral region of the retina along the horizontal meridian of the wearer's eye.

21. An ophthalmic lens element according to claim 18 wherein the range defined by $r_a \leq r_x \leq r_b$ is substantially 10 mm $\leq r_x \leq$ 22 mm.

22. An ophthalmic lens element according to claim 18 wherein the positive gradient over the range $r_a \leq r_x \leq r_b$ provides a positive mean surface power increase of at least 1.00 D relative to the surface power at the optical centre.

23. An ophthalmic lens element according to claim 18 wherein the positive gradient over the range $r_a \leq r_x \leq r_b$ provides a positive mean surface power increase of at least 1.50 D relative to the surface power at the optical centre.

24. An ophthalmic lens element according to claim 18 wherein the positive gradient over the range $r_a \leq r_x \leq r_b$ provides a positive mean power increase of at least 2.00 D relative to the surface power at the optical centre.

25. An ophthalmic lens element according to claim 18 wherein the positive gradient over the range $r_a \leq r_x \leq r_b$ provides a positive mean power increase of at least 2.50 D relative to the surface power at the optical centre.

26. An ophthalmic lens element according to claim 18 wherein the positive gradient over the range $r_a \leq r_x \leq r_b$ provides a positive mean power increase of at least 3.00 D relative to the refracting power at the optical centre.

27. An ophthalmic lens element according to claim 18 wherein $r_a$ corresponds with a boundary between the foveal vision zone and the progressive zones defined by a +0.25 D contour of mean surface power on the mean power profile.

28. An ophthalmic lens element according to claim 18 wherein the difference between $r_a$ and $r_b$ is not less than substantially 8 mm.

29. An ophthalmic lens element according to claim 17 wherein the foveal vision zone includes an aperture having a shape and/or size that corresponds with the extent of a wearer's typical eye rotations before they engage head rotation.

30. A series of ophthalmic lens elements according to claim 17 wherein each lens in the series provides a peripheral region having a range of positive mean power corresponding with different peripheral correction requirements.

31. A series of ophthalmic lens elements according to claim 30 wherein for each lens in the series the size and/or shape of the central region is associated with a predetermined range of eye rotations for the wearer.

32. A method of dispensing or designing an ophthalmic lens element for retarding or arresting myopia in a wearer's eye, the method including:
   obtaining, for the wearer:
      a first required value of optical correction for foveal vision for on-axis viewing tasks; and
      a second required value of optical correction for providing a stimulus for retarding or arresting myopia in a peripheral region of the wearer's eye located along the horizontal meridian of the eye;
   selecting or designing an ophthalmic lens element according to the values of optical correction, the ophthalmic lens element having a front surface and a rear surface, at least one of the surfaces including a horizontal meridian and a vertical meridian, the lens element including:
      a central region including a foveal vision zone providing a first power corresponding to the first required value; and
      a peripheral region of positive power relative to the first power, the peripheral region including dual progressive zones located bilaterally of the vertical meridian and extending radially outwardly from the central region, the progressive zones providing a value or distribution of plus power according to the second required value;
   wherein the lens element provides a distribution of surface astigmatism which provides, on the horizontal meridian, a relatively low surface astigmatism in the central region and the progressive zones.

33. A semi-finished ophthalmic lens blank including a first surface having:
   a horizontal meridian and a vertical meridian;
   a central region including a foveal vision zone providing a surface power to achieve a refracting power for providing clear foveal vision for a wearer; and
   a first progressive zone located nasally of the central region and a second progressive zone located temporally of the central region, each progressive zone extending radially outwardly from the central region to provide a gradual increase in surface mean power along the horizontal meridian;

wherein the surface provides a distribution of surface astigmatism which provides, along the horizontal meridian, a relatively low surface astigmatism in the central region and the progressive zones.

34. A finished lens element for a wearer, the finished lens element formed from the semi-finished ophthalmic lens of claim 33, the finished lens element providing a second surface which optically combines with the first surface so that when worn by the wearer the finished lens element positions the tangential focal plane and the sagittal focal plane on or in front of the wearer's retina along the horizontal meridian of the eye.

35. A finished lens element according to claim 34 wherein the tangential focal plane leads the sagittal focal plane.

36. A finished lens element according to claim 34 wherein the sagittal focal plane leads the tangential focal plane.

* * * * *